(12) United States Patent
Petkov et al.

(10) Patent No.: US 11,494,881 B2
(45) Date of Patent: Nov. 8, 2022

(54) GLOBAL MOVEMENT IMAGE STABILIZATION SYSTEMS AND METHODS

(71) Applicant: HB Innovations, Inc., Los Angeles, CA (US)

(72) Inventors: George H. Petkov, Heemstede (NL); Stiliyan Kalitzin, Bunnik (NL); Peter Fornell, Los Angeles, CA (US)

(73) Assignee: HB Innovations, Inc., Los Angeles, CA (US)

( * ) Notice: Subject to any disclaimer, the term of this patent is extended or adjusted under 35 U.S.C. 154(b) by 122 days.

(21) Appl. No.: 17/136,228

(22) Filed: Dec. 29, 2020

(65) Prior Publication Data

US 2022/0207657 A1    Jun. 30, 2022

(51) Int. Cl.
*G06T 5/00* (2006.01)
*G06T 7/269* (2017.01)
*G06T 5/50* (2006.01)

(52) U.S. Cl.
CPC .............. *G06T 5/003* (2013.01); *G06T 5/50* (2013.01); *G06T 7/269* (2017.01); *G06T 2207/10016* (2013.01); *G06T 2207/20201* (2013.01)

(58) Field of Classification Search
None
See application file for complete search history.

(56) References Cited

U.S. PATENT DOCUMENTS

| | | | |
|---|---|---|---|
| 9,661,228 B1 * | 5/2017 | Klivington | H04N 5/23254 |
| 2005/0179784 A1 * | 8/2005 | Qi | H04N 5/23254 |
| | | | 348/208.1 |

(Continued)

OTHER PUBLICATIONS

Dong et al., Motion Flow Estimation from Image Sequences with Applications to Biological Growth and Motility, Proc. Int. Conf. Image Proc., pp. 1245-1248, (Oct. 8, 2006).

(Continued)

*Primary Examiner* — Emily C Terrell
*Assistant Examiner* — Nathan J Bloom
(74) *Attorney, Agent, or Firm* — Akerman LLP

(57) ABSTRACT

A method of global movement image stabilization may include calculating a global motion group parameter with respect to first and second sequential frames for two or more elementary 2D motion components of a motion group. Each global motion group parameter may be applied to a motion group vector field that corresponds to the elementary 2D motion component to which the respective global motion group parameter applies to generate a global motion group vector field corresponding to each elementary 2D motion component of the motion group. The global motion group vector fields may be summed pointwise to generate a global motion deformation vector field that provides global motion from the second frame to the first frame. The global deformation vector field may be cumulated with a previous cumulative global deformation vector field that provides global movement from the first frame to one or more previous frames to generate a current cumulative global motion deformation vector field. The second frame may be deformed by the current cumulative global motion deformation vector field to generate a stabilized frame having global movement removed.

25 Claims, 12 Drawing Sheets

(56) References Cited

U.S. PATENT DOCUMENTS

| | | | |
|---|---|---|---|
| 2006/0159311 A1 | 7/2006 | Bober et al. | |
| 2006/0274156 A1 | 12/2006 | Rabbani et al. | |
| 2006/0280249 A1* | 12/2006 | Poon | G06T 5/50 |
| | | | 375/240.16 |
| 2008/0175439 A1* | 7/2008 | Kurata | H04N 19/533 |
| | | | 375/E7.193 |
| 2011/0242339 A1* | 10/2011 | Ogawa | H04N 5/23254 |
| | | | 348/208.4 |
| 2012/0120264 A1* | 5/2012 | Lee | H04N 5/23254 |
| | | | 348/208.4 |
| 2014/0198852 A1 | 7/2014 | Incesu et al. | |
| 2014/0355834 A1 | 12/2014 | Qureshi et al. | |
| 2016/0205323 A1* | 7/2016 | Jiang | H04N 5/23277 |
| | | | 348/208.4 |
| 2016/0295208 A1* | 10/2016 | Beall | G06T 7/20 |
| 2018/0040133 A1* | 2/2018 | Srinivasan | H04N 19/43 |
| 2018/0247423 A1* | 8/2018 | Suzuki | G06T 5/50 |
| 2018/0330510 A1* | 11/2018 | Watanabe | G06T 5/003 |
| 2018/0376068 A1* | 12/2018 | Shimatani | G06T 5/003 |
| 2021/0192737 A1* | 6/2021 | Zhou | G06T 7/248 |

OTHER PUBLICATIONS

Li et al., Optical Flow Estimation for a Periodic Image Sequence, IEEE Trans. Image Process, 19(1):1-10 (Jan. 2010).

Kalitzin et al., Optical Flow Group-Parameter Reconstruction from Multi-Channel Image Sequences, Applications of Intelligent Systems, pp. 290-301, N Petkov et al. eds., IOS Press (2018).

Alfonso, Image Reconstruction and Restoration for Optical Flow-based Super Resolution, Master Thesis, Universitat Politecnica de Catalynya, Barcelona, Spain, Apr. 18, 2012.

International Search Report and Written Opinion, PCT/US2021/052633, dated Dec. 28, 2021.

* cited by examiner

GLOBAL MOVEMENT IMAGE STABILIZATION SYSTEMS AND METHODS

TECHNICAL FIELD

The present disclosure relates to image stabilization systems and methods of image stabilization. More specifically, the present disclosure relates to global movement image stabilization of sequential image frames, such as removal of an accumulated global movement to stabilize images while retaining local movement between frames.

BACKGROUND

Imaging devices, such as video cameras, capture sequential images of a scene relative to the location and angle of image capturing components of the device. Captured image frames may be sequentially ordered to reproduce a visual moving depiction or video of the scene captured by the camera. There are a number of uses for these moving depictions, many being ubiquitous in modern life, such as recording important events, movie and television entertainment, archiving, and image analysis.

A single camera captures a 3D scene as a 2D image. This 2D representation of a 3D scene brings complexities to image analysis due to loss or obscuring of depth, relationships between angle of capture and image plane, and the presence of non-linear movements relative to the image plane. For example, a moving imaging device or moving objects within a captured scene may pose a challenge with respect to extracting relevant features in video sequences and detecting properties for various applications. These challenges may be magnified when the goal is to measure and/or analyze minor or small local movements of objects or when an object in which local movement is desired to be analyzed is subject to a global movement, or the location and/or angle of the imaging device is changing. What is needed are improved image stabilization techniques to address these challenges.

SUMMARY

In one aspect, a global movement image stabilization method includes reading a first frame and a second frame of an image sequence, wherein the first frame occurs chronologically earlier than the second frame in the image sequence. For example, the first frame may have an earlier timestamp than the second frame, and reading the frames may include reading the timestamps of the first frame and second frame to order the frames for processing according to the method. The method may also include calculating a global motion group parameter for each elementary 2D motion component of a motion group. The global motion group parameter may be calculated with respect to motion from the second frame to the first frame. The motion group may define a group of elementary 2D motion components that decompose complex motion within a 2D plane. For example, the motion group may specify a list of elementary 2D motion components used to decompose complex motion in the frames such that the sum of the elementary 2D motion components when used to decompose motion between frames approximates or estimates the more complex motion taking place between the frames. The method may also include applying each global motion group parameter to a motion group vector field that corresponds to the elementary 2D motion component to which the respective global motion group parameter applies to generate a global motion group vector field corresponding to each elementary 2D motion component of the motion group. The method may also include summing the global motion group vector fields pointwise to generate a global motion deformation vector field that provides global motion from the second frame to the first frame. The method may further include cumulating the global deformation vector field with a previous cumulative global deformation vector field that provides global movement from the first frame to one or more previous frames to generate a current cumulative global motion deformation vector field. The method may also include deforming the second frame by the current cumulative global motion deformation vector field to generate a stabilized frame.

In one example, calculating the global motion group parameters comprises calculating a mean magnitude of motion for each elementary 2D motion component of the motion group.

In the above or another example, the method may further include segmenting the first and second frames. The global motion group parameters may be calculated from the segmented first and second frames. In a further example, segmenting the first and second frames comprises applying spectral segmentation to the first and second frames using RGB values. In some examples, other segmentation techniques may be applied, such as those described herein.

In any of the above or another example, the elementary 2D motion components of the motion group comprise two or more of X translation, Y translation, dilatation, rotation, shear out, and shear in.

In any of the above or another example, the elementary 2D motion components of the motion group comprise X translation, Y translation, dilatation, rotation, shear out, and shear in.

In any of the above or another example, the motion group vector fields are members of a group G and are set to a frame size corresponding to the first and second frames. In a further example, the method further includes generating the motion group vector fields of group G.

In any of the above or another example, the first and second frames are multichannel images. In another example, the frames are grayscale.

In any of the above or another example, the method further comprises calculating an optical flow vector field that drives the second frame to the first frame; decomposing the optical flow vector field by the motion group to determine a motion group decomposition vector field for each elementary 2D motion component of the motion group; and calculating the global motion group parameters from the motion group decomposition vector fields.

In one example, the method includes repeating the method, which may include repeating the method according to any of the examples, for one or more additional sequential frames. The method may also include replacing original frame with corresponding stabilized frames, timestamping stabilized frames with timestamps corresponding to original frames, sequencing stabilized frames according to their chronological capture, and or saving the stabilized frames.

In another aspect, a global movement image stabilization system includes a memory that stores instructions and processor that executes the instructions to perform operations including: reading a first frame and a second frame of an image sequence, wherein the first frame is chronologically earlier than the second frame in the image sequence; calculating, with respect to motion from the second frame to the first frame, a global motion group parameter for each elementary 2D motion component of a motion group, wherein the motion group defines a group of elementary 2D motion components that decompose complex motion within a 2D plane; applying each global motion group parameter to a motion group vector field that corresponds to the elementary 2D motion component to which the respective global motion group parameter applies to generate a global motion group vector field corresponding to each elementary 2D motion component of the motion group; summing the global motion group vector fields pointwise to generate a global motion deformation vector field that provides global motion from the second frame to the first frame; cumulating the global deformation vector field with a previous cumulative global deformation vector field that provides global movement from the first frame to one or more previous frames to generate a current cumulative global motion deformation vector field; and deforming the second frame by the current cumulative global motion deformation vector field to generate a stabilized frame.

The motion group may specify a list of elementary 2D motion components used to decompose complex motion in the frames such that the sum of the elementary 2D motion components when used to decompose motion between frames approximates or estimates the more complex motion taking place between the frames.

In one example, the first frame may have an earlier timestamp than the second frame, and reading the frames may include reading the timestamps of the first frame and second frame to order the frames for performing the operations. In this or another example, reading the frames may include identification of a file type, format type, and/or frame size.

In any of the above or another example, the global motion group parameters comprise values for mean magnitude of motion for each elementary 2D motion component of the motion group.

In any of the above or another example, the operations further include segmenting the first and second frames, and calculating the global motion group parameters from the segmented first and second frames.

In any of the above or another example, the first and second frames are segmented by spectral segmentation using RGB values. In another example, the frames are segmented by another technique, such as any of those described herein.

In any of the above or another example, the elementary 2D motion components of the motion group comprise two or more of X translation, Y translation, dilatation, rotation, shear out, and shear in.

In any of the above or another example, the elementary 2D motion components of the motion group comprise X translation, Y translation, dilatation, rotation, shear out, and shear in.

In any of the above or another example, the motion group vector fields are members of a group G and are set to a frame size corresponding to the first and second frames. In a further example, the operations further include generating the motion group vector fields of group G.

In any of the above or another example, the first and second frames are multichannel images. In another example, the frames are grayscale.

In any of the above or another example, the operations further include calculating an optical flow vector field that drives the second frame to the first frame; decomposing the optical flow vector field by the motion group to determine a motion group decomposition vector field for each elementary 2D motion component of the motion group; and calculating the global motion group parameters from the motion group decomposition vector fields.

In one example, the operations include repeating the operations, which may include repeating the operations according to any of the examples, for one or more additional sequential frames. The operations may also include replacing original frame with corresponding stabilized frames, timestamping stabilized frames with timestamps corresponding to original frames, sequencing stabilized frames according to their chronological capture, and or saving the stabilized frames.

In yet another aspect, a global movement image stabilization system includes a memory that stores instructions and processor that executes the instructions to perform operations including: calculating an optical flow vector field that drives a second frame of an image sequence to a first frame of an image sequence, wherein the first frame is chronologically earlier than the second frame in the image sequence; decomposing the optical flow vector field by a motion group to determine a motion group decomposition vector field for each elementary 2D motion component of the motion group, wherein the elementary 2D motion components decompose complex motion within a 2D plane; calculating global motion group parameters from the motion group decomposition vector fields; applying each global motion group parameter to a motion group vector field that corresponds to the elementary 2D motion component to which the respective global motion group parameter applies to generate a global motion group vector field corresponding to each elementary 2D motion component of the motion group; summing the global motion group vector fields pointwise to generate a global motion deformation vector field that provides global motion from the second frame to the first frame; cumulating the global deformation vector field with a previous cumulative global deformation vector field that provides global movement from the first frame to one or more previous frames to generate a current cumulative global motion deformation vector field; and deforming the second frame by the current cumulative global motion deformation vector field to generate a stabilized frame.

The motion group may specify a list of elementary 2D motion components used to decompose complex motion in the frames such that the sum of the elementary 2D motion components when used to decompose motion between frames approximates or estimates the more complex motion taking place between the frames.

In one example, the first frame may have an earlier timestamp than the second frame, and the operations may include reading the timestamps of the first frame and second frame to order the frames for processing. In this or another example, the operations may include reading the frames to identify a file type, format type, and/or frame size.

In any of the above or another example, the global motion group parameters comprise values for mean magnitude of motion for each elementary 2D motion component of the motion group.

In any of the above or another example, the operations further include segmenting the first and second frames, and calculating the global motion group parameters from the segmented first and second frames.

In any of the above or another example, the first and second frames are segmented by spectral segmentation using RGB values. In another example, the frames are segmented by another technique, such as any of those described herein.

In any of the above or another example, the elementary 2D motion components of the motion group comprise two or more of X translation, Y translation, dilatation, rotation, shear out, and shear in.

In any of the above or another example, the elementary 2D motion components of the motion group comprise X translation, Y translation, dilatation, rotation, shear out, and shear in.

In any of the above or another example, the motion group vector fields are members of a group G and are set to a frame size corresponding to the first and second frames. In a further example, the operations further include generating the motion group vector fields of group G.

In any of the above or another example, the first and second frames are multichannel images. In another example, the frames are grayscale.

In any of the above or another example, the operations further include calculating an optical flow vector field that drives the second frame to the first frame; decomposing the optical flow vector field by the motion group to determine a motion group decomposition vector field for each elementary 2D motion component of the motion group; and calculating the global motion group parameters from the motion group decomposition vector fields.

In one example, the operations include repeating the operations, which may include repeating the operations according to any of the examples, for one or more additional sequential frames. The operations may also include replacing original frame with corresponding stabilized frames, timestamping stabilized frames with timestamps corresponding to original frames, sequencing stabilized frames according to their chronological capture, and or saving the stabilized frames.

BRIEF DESCRIPTION OF THE DRAWINGS

For a complete understanding of the present disclosure and its features and advantages, reference is now made to the following description, taken in conjunction with the accompanying drawings, in which.

DESCRIPTION

Figure 1:
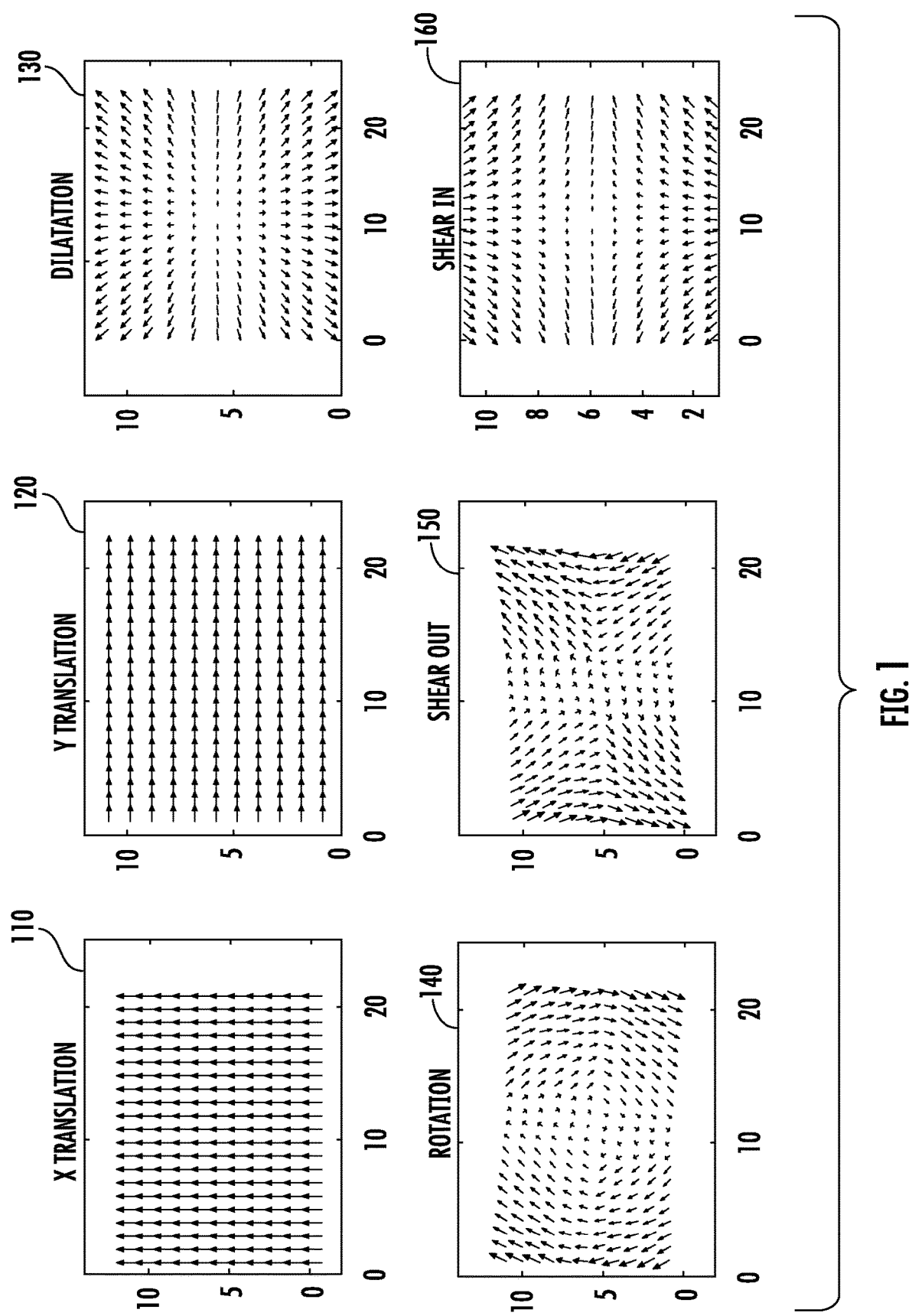
FIG. 1 illustrates an example motion group including six vector fields representing six elementary 2D movement components according to various embodiments described herein.

The present description describes global movement image stabilization ("GMIS") systems and processes for stabilization of global movement within images and image sequences. According to various embodiments, GMIS may include a movement cleansing technique for the reduction of global scene variation according to a pre-defined group underlying the movement process. The technique may be applied to sequential images for GMIS of video sequences. For example, GMIS may include removal of global movements from video image frames while retaining local movement. The GMIS described herein is not limited to grayscale images and may be applied to multichannel images. The GMIS described herein may also be used to remove global movements, such as those that apply to a whole frame, while maintaining local movements.

Classical optical flow techniques are restricted to grayscale images. In various embodiments, the present disclosure removes such restrictions. For example, the present techniques may utilize a modified optical flow, such as SOFIA, as described in more detail in Kalitzin, S., Geertsema, E. and Petkov, G. 2018, Scale-iterative optical flow reconstruction from multi-channel image sequences, Frontiers in Artificial Intelligence and Applications. 310, (2018), 302-314. DOI: https://doi.org/10.3233/978-1-61499-929-4-302, "Kalitzin et al. 2018a", the contents of which are hereby incorporated herein by reference.

Classical and modified optic flow techniques are computationally expensive because they calculate derivatives at each pixel in an image frame. In various embodiments, the techniques described herein may be beneficially employed such that the optical flow calculations may be skipped and a methodology which includes decomposition of movement into 2D movement components and calculation of an estimate of average movement within each such layer without employing optic flow calculation may be used. For example, the present disclosure may utilize techniques to directly estimate motion group parameters, such as average global movement, while avoiding a need to calculate optical flow at every pixel. In one example, average global movement may be estimated directly using a technique such as GLORIA, which is described in more detail in Kalitzin, S., Geertsema, E. and Petkov, G. 2018, Optical flow group-parameter reconstruction from multi-channel image sequences, Frontiers in Artificial Intelligence and Applications. 310, (2018), 290-301, DOI: https://doi.org/10.3233/978-1-61499-929-4-290, "Kalitzin et al. 2018b", the contents of which are hereby incorporated by reference. The methodology may be applied in a multichannel case as well as grayscale cases.

Movements in the real world are rarely linear; however, when we observe the same 2D scene at two temporally close moments of time, for example, time1 and time2, we get two 2D images. If the images are identical, movement cannot be detected. If, however, the images differ, then movement may be detected. While the exact movement paths occurring between the two images may not be determinable from a mere comparison of the initial positions at time1 and the end positions at time2, an estimated path may be determined that is descriptive of the direction of the movement that brought the initial configuration of the points in the first image at time1 to the different, subsequent configuration of the points in the second image at time2, even though the real movement that led the first image to the second image may have been very complex and full of nonlinear elements. The result of movement between the images may be achieved via approximation by decomposing the complex, or nonlinear, 2D movement into elementary 2D motions in a plane such that nonlinearity is approximated by linear operations on a finite set of elements or components of motion for each point of the image. Movements between sequential image frames may be represented by a 2D vector field. Each 2D vector may be deconstructed into two or more "elementary" 2D linear components of motion within a plane, with the sum of the deconstructed 2D linear motion components representing the respective 2D vector. Thus, a motion group of "elementary" 2D linear motion components may be constructed to represent any vector field in an image plane, with each motion group member keeping information about one "elementary" 2D linear motion component. Hence, the movement may be changed by keeping or removing pre-defined motion components. According to various embodiments, these transformations may be utilized to define a motion group that may be used to decompose 2D motion between images into two or more of its 2D motion components to form a group of transformations representative of the 2D movement. Accordingly, any movement between two image frames may be presented as a superposition of the motion group. In some embodiments, an optic flow vector field that drives motion between two image frames may be decomposed into a plurality of motion group decomposition vector fields, one for each non-homogeneous linear component of motion in the motion group, or motion group component. The motion group will typically comprise or consist of two or more 2D linear motion components, such as one or more translations, rotations, dilations, or shear motions. The motion components may decompose more complex motion in a 2D plane, such as an image plane, into simpler or elementary components of motion. Thus, the method may be used to depict a continuous world on a finite, discrete set of frames. Because the time between two frames or frame rate is short enough for the human eye, the linearization of nonlinear elements also goes unnoticed by the eye. Therefore, higher frame rates may be used to obtain a better result. It is to be appreciated that reference to sequential frames in the present disclosure does not require that frames be those immediately or unbroken consecutively captured by an imaging device, rather the sequential frames are chronologically sequence such that the first frame was captured prior to the second frame or stated another way the second frame follows in time from the first frame. Those having skill in the art realize that the GMIS described herein may be applied to images captured at any frame rate. Thus, for image sequences captured at high frame rates, it may be desirable in some situations to apply GMIS to sequential frames representing every other captured frame or other sequential frame selection methodology while discarding image frames intervening selected sequential frames.

The number of motion group components or layers in the motion group used to describe movement between frames may vary based on the image scene and/or desired level of global stabilization. In various embodiments, the motion group may be defined to include two or more elementary 2D linear motion components selected from X translation, Y translation, dilatation, rotation, shear out, and shear in. Using these six motion components, the motion group may be used to describe motion between sequential frames such that each possible nonlinearity is approximated by linear operations on the finite set of the six elements for each point of the image. For example, with reference to FIG. 1, a motion group including two or more non-homogeneous 2D elementary motion components may be used to generate a group G 100 of motion group vector fields, each motion group vector field representing a member motion component of the motion group. In the illustrated example, the motion group includes six motion group components: X translation, Y translation, dilatation, rotation, shear out, and shear in, and group G includes a motion group vector field for each motion group component: X translation 110, Y translation 120, dilatation 130, rotation 140, shear out 150, shear in 160. As described in more detail below, motion group parameters may be applied to the group G vector fields to generate a group transformation. The group transformation may be a set of modified motion group component vector fields, wherein the motion group parameters add, remove, or modify magnitudes of one or more vectors in one or more vector fields that, if summed pointwise, would otherwise generate an optical flow vector field that would drive the observed motion between two frames. For example, global motion group parameters including the mean magnitude of motion calculated for each motion group component may be applied to the motion group vector fields to generate a group transformation of global motion group vector fields that when summed pointwise drives global motion between the two frames. The vector fields of each motion group vector field is shown for a frame size with 11×21 points. In this illustration, the points may be considered to be analogous to pixels in the frame. However, in some embodiments, points may include groupings of multiple pixels.

In various embodiments, generating group comprises determining the size of the image frames group G is to be applied to estimate the more complex motions between two frames and to apply the frame size to each motion group component of the motion group to generate a motion group vector field for each component. Using FIG. 1 as an example, with a frame size of 11×21 pixels, the inhomogeneous set of elementary 2D motion components may include six motion components: X translation 110, Y translation 120, dilatation 130, rotation 140, shear out 150, shear in 160. Thus, group G includes motion group vector fields or representative equations for the vector fields having the size and a predetermined number of motion components, wherein each motion group component is represented by a vector field, e.g., for group G shown in FIG. 1 having a vector field of size 11×21 for each of the six motion group components.

As introduced above and described in more detail below, motion group parameter values calculated from motion between two frames with respect to each motion group component may be applied to respective motion group vector fields of the group G to generate a transformation group comprising the modified vector fields presenting mean motion between the frames, the pointwise sum of which presents the total mean motion. In one embodiment, a method for GMIS of a sequential frame sequence including a first image frame and a second image frame may include generating an optical flow vector field which drives the first frame to a second frame, or the second frame to the first frame. This optical flow vector field may then be decomposed by the motion group to generate motion group decomposition vector fields that represent the respective motion components of the optical flow vector field. Global components may be calculated from each of the resulting decomposition vector fields of the motion group. Having identified the global components, the global components may be removed from the second frame. For example, the second frame may be deformed by the transformations of the motion group or a summed vector field of the decomposition vector fields having the calculated global components removed and the local movements retained. The method may include repeating the above for each sequential frame whereby each iteration cumulates the global movements up to the current frame in a cumulative global vector field such that when the current frame is deformed by the cumulative global vector field, the global movements from the initial frame to the current frame are removed, leaving only local movements.

In one example, GMIS utilizes an optical flow technique wherein optical flow between two consequent frames $F_1 \rightarrow F_2$ estimates the velocities at each point of $F_1$ as an optical flow vector field V, which, when morphed to the frame $F_1$, transforms it to frame $F_2$. Having the vector field V, different types of movements may be estimated. For example, as introduced above, any movement in a 2D plane can be presented as a superposition of "elementary" 2D movement components, e.g., transformations, if the "elementary" transformations form a group representative of the movement in the 2D plane. A motion group representation group G of the structural tensor may be generated using a plurality of such transformations. The vector field V may be decomposed by the group G and the total movement at each point as a superposition of the transformations from group G may be obtained to generate the group transformations. For example, the transformations may include 2 translations, dilatation, rotation, 2 shear transforms, see, e.g., FIG. 1, and vector field V may be decomposed into six layers, each layer representing total movement at each point as a superposition of one of the transformations making up the group. The total average of each layer may be calculated to give the global movement from $F_1$ to $F_2$. For example, a "spectral optic flow" which can work with multichannel image sequences and that can be applied to not only to 3 RGB colors but to medical images with multiple channels as well may be used, e.g., as described in Kalitzin et al. 2018a, incorporated herein by reference. Averages, which represent global movement, of the layers of vector field V ($F_1 \rightarrow F_2$) may be removed, leaving the local movement. The resulting group transformations having global movement removed or an accumulated vector field W of the group may be morphed with frame $F_1$ to reconstruct a new stabilized frame $f_{2stablized}$, which substitutes the frame $F_2$ in the stabilized sequence. This methodology may be repeated for subsequent frames whereby the vector field W generated for each iteration is morphed to the preceding stabilized frame to thus obtain the desired "Global movement image stabilization".

In another embodiment, and as introduced above, rather than generating a vector field V ($F_1 \rightarrow F_2$) and morphing a previous original or stabilized image frame $F_1$ with a vector field that presents local movements between the previous image frame $F_1$ and a current image frame $F_2$ having global movements removed, vector field V may represent movement that drives $F_2$ to $F_1$ and vector field W may be generated to include only global movements from the layers of the vector field V ($F_2 \rightarrow F_1$). Vector field W may then be applied or morphed to frame $F_2$ in a manner that removes global movement for this current frame to generate a new stabilized frame $F_{2stabilized}$, which substitutes for frame $F_2$ in the stabilized sequence. For each subsequent frame applied to the process, global movement calculated with respect to a current and previous frame may be cumulated with global movement calculated from frames since initiation of the process to obtain a cumulative vector field $W_{cumulative}$ representing global movement up to the current frame, that when applied or morphed to the current frame, removes the accumulated global movement to generate a stabilized current frame $F_{current}$ stabilized.

The GMIS process may optionally be configured to focus on or apply global movement processing to a region of interest (ROI). The ROI may be detected or predetermined. For example, application of the global stabilization processing may be limited to the ROI while other parts of the image frame are ignored. This may be used to more precisely track global movement in a desired region of the image for removal by specifying parts of the frame in which global movement is expected while also reducing computation. For example, the total frame may not contain global movements, but rather only a part of the frame may behave like global movement driven.

In one example, GMIS may integrate image segmentation. Image segmentation may be utilized to reduce computational load by segmenting images such that the process is applied to regions of interest wherein global movement is to be tracked and removed via application of the GMIS process.

Various segmentation techniques that may be used include identification of shapes, textures, grayscale values, or spectral values of pixels or groups thereof. Segmentation may utilize predefined parameter values, size, or characteristics and/or detection of the same wherein particular ranges, thresholds, location/regions, and/or relationships of the same are used to direct or inform segmentation. Image segmentation may be object or boundary based. For instance, segmentation may be directed by object identification, background separation, or boundary or edge detection. Methodologies that may be employed may include but are not limited to regional-based, edge detection, clustering, compression, thresholding, model-based, graph partition-based, or watershed transformation techniques. In some examples, various machine learning and/or object detection or recognition processes may be applied to direct or inform image segmentation. For instance, neural networks such as a convolutional neural network may be utilized.

In one embodiment, segmentation may include spectral filtering to identify or isolate segments of the frame with respect to the applied process. Spectral filtering may separate an object from the background or other objects in an image frame. In one example, spectral filtering may be used to isolate an object of interest or identify boundaries of an object known, determined to be, or predicted to be a source of global, local, or other movements. Pixels within such boundaries may be segmented as subject to global, local, or other movements. In one embodiment, spectral filtering may be used in image segmentation utilizing detected or predefined spectral characteristics, such as RGB values. Thresholding may also be used.

In some embodiments, one or more ROI may be specified by face detection. Face detection may be used to define a region, such as a face and a surrounding area, which may be pre-specified in size or value or may be based on detected characteristics, such as spectral characteristics, of the surrounding regions of the image frame. In some embodiments, face or other object detection techniques may be used in combination with spectral filtering for image segmentation. In one embodiment, image segmentation is not used.

In various embodiments, the GMIS process may optionally include or exclude detecting or predefining a center of the vector field associated with movement between sequential frames. For instance, the center of a constructed vector field may not be at the center of the scene. Thus, the process may include calculating and applying a center of each transformation generating the 2D group transformations.

In some embodiments, the GMIS process may optionally include or exclude evaluating an angle between a frame and a frontal image plane. For instance, the frame may not be in the frontal image plane as it may make an angle other than 0 degrees with the frontal image plane. Thus, the process may include calculating the angle, e.g., its size and direction, which means two angles, and deforming the vector fields of sequential frames accordingly.

Figure 2:
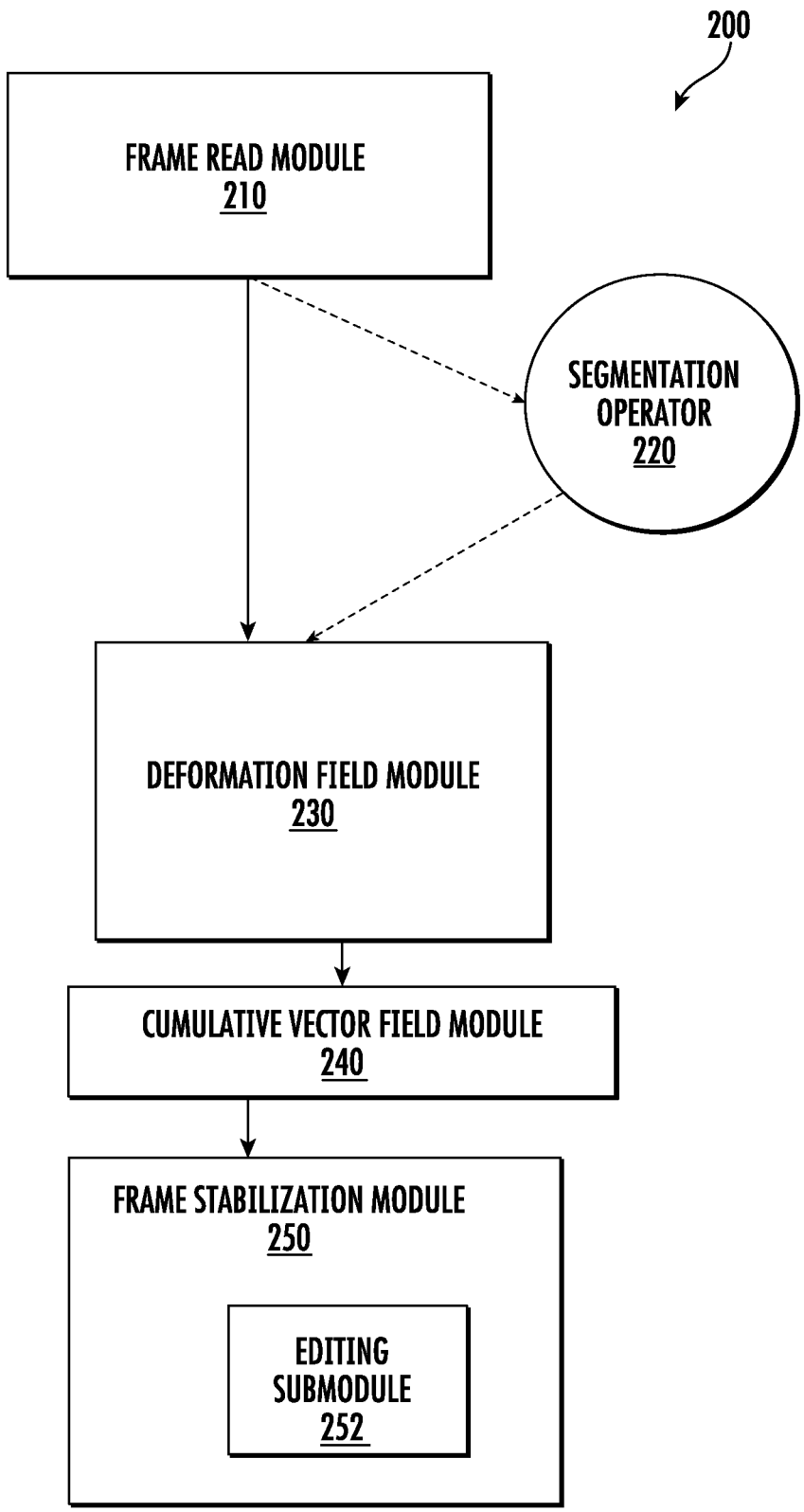
FIG. 2 schematically illustrates a global movement image stabilization ("GMIS") system according to various embodiments described herein.

FIG. 2 schematically illustrates a GMIS system 200 configured process image frames to generate stabilized image sequences having global movement removed. The system 200 and its corresponding description may be utilized to perform the various methods and processes described herein.

The system 200 may include a frame read module 210 configured to read image frames. Reading the frame may include analysis, identification, or reading data with respect to the frame or its parameters. In one embodiment, reading the frame may comprise or consist of receiving the frame data for input into the system or process. In a further embodiment, reading the frame may include identification of a format for the images, which may include confirmation that the frame is in a suitable frame-based format. The system 200 and related methods described herein may be applied to real-time processing of video images or post-processing of video images, e.g., a movie, which has been saved on a media. The frame read module 210 may read the movie frame by frame, sequentially (one frame at each step), together with the timestamp of the frame. The movie should be in a 'frame-based' format, i.e., a format which allows distinguishing the frames and distinguishing their timestamps. Stabilized frames may be saved with timestamps corresponding to its non-stabilized frame counterpart. Maintaining frames together with their timestamps may be utilized to provide for proper frame ordering in time, saving of the stabilized frame file with same dynamics as the original, and calculating the motion derivatives. For example, two sequential frames provide the initial and end positions of objects captured in the scene, and to calculate speed, that is the derivative, one needs the precise time between the two positions in the frames. Thus, distinguishing frames and corresponding timestamps may be requisite for the calculation of the motion derivatives. If frame rate is known and constant for frames of a known sequence, timestamps may be assigned to stabilized frames corresponding to original frames.

The system 200 may include an optional segmentation operator 220. The segmentation operator 220 may be configured to segment images as described herein or otherwise according to any known or later developed image segmentation process. In operation, the segmentation operator 220 may receive or otherwise access or obtain an image or image data associated with an image frame, e.g., from the frame read module 210 or otherwise, and output a segmented image, which may include corresponding image data.

The system 200 may include a deformation field module 230 configured to generate a deformation vector field that modifies one or more types of motion between two frames when morphed to one of the frames. The present disclosure typically describes the removal of global motion to stabilized frames and thus the deformation field module 230 is generally described herein to generate a global deformation vector field $V_{current\ global}$ that removes global motion from a current frame $F_{current}$ that occurred between the current frame $F_{current}$ and a previous frame $F_{current-1}$.

In some embodiments, the deformation module 230 may be configured for optical flow group parameters reconstruction. In operation, the deformation field module 230 may receive or otherwise access or obtain original image frames, or segmented image frames, e.g., from the frame read module 210 or optional segmentation operator 220.

The deformation field module 230 may utilize one or more algorithms for calculating optical flow, such as classical optical flow calculations or modified optical flow calculations. Modified optical flow calculations may include spectral optical flow that expands beyond grayscale, see, e.g., Kalitzin et al. 2018a. For example, in various embodiments, the deformation field module 230 may process two image frames, e.g., current image frame $F_2$, previous image frame $F_{current-1}$, to generate an optical flow vector field $V_{current}$ presenting a diffeomorphism between the two frames. Vector field $V_{current}$ represents a vector field that drives frame $F_{current}$ to previous image frame $F_{current-1}$ and includes both global and local motion. The deformation field module 230 may decompose the vector field $V_{current}$ by motion group components to generate the motion group decomposition vector fields that decompose optical flow vector field $V_{current}$ into each of the motion group components used in group G. The deformation field module 230 may then calculate the total average of each layer to generate the global motion group parameters from the motion group decomposition vector fields. These global motion group parameter values may then be applied to the motion group vector fields of group G to generate the global motion group component vector fields that may then be summed pointwise to generate the global motion deformation vector field $V_{current}$ global.

As noted above, in some embodiments, the deformation field module 230 is configured to utilize an advanced motion group parameter algorithm. For example, the deformation field module 230 may be configured to calculate/estimate global motion group parameters for each motion group component represented in group G and apply the global motion group parameters to the respective group G motion group vector fields to generate modified motion group vector fields or global motion group vector fields in this example including the global motion from $F_{current}->F_{current-1}$ decomposed into the motion components of group G. The deformation field module 230 may sum the global motion group vector fields pointwise to generate the global motion deformation vector field $V_{current\ global}$ that represents the global movement from $F_{current}->F_{current-1}$. Thus, rather than utilizing classical or modified optical flow, the deformation field module 230 may use an advanced motion group parameter algorithm, such as GLORIA, that calculates an estimate of average global movement within each motion group layer without employing optic flow calculations. This direct estimate of global motion group parameters, such as average global movement, avoids the computationally expensive task of calculating optical flow at every pixel to calculate an optical flow vector field $V_{current}$ as described above.

The deformation field module 230 may also define, generate, or obtain the group G of elementary motion group vector fields. The frame size may be fixed and input into one or more motion group equations. The resulting group G of elementary motion group vector fields may be generated at initiation, or prior to application of group G. The size of each of the vector field may be equal to the size of the frame in pixels. In the example provided in FIG. 1, the generated group G includes six vector fields (motion group vector fields), each representing one of the motion group components of the motion group and having an example frame size of 21×11 pixels. Group G is preferably defined and generated prior to initiation of the process, such as in an initiation step including analysis of an initial frame, or within a first step that includes motion analysis between the initial frame and a first subsequent frame to avoid unnecessarily recalculating group G at each step. Thus, while group G may be generated at each iteration applied to a subsequent frame in the process, generation of group G may typically be performed at initiation of processing or prior to decomposition of the optical flow vector field Vinit that presents the diffeomorphism between an initial frame and a first subsequent frame and thereafter be carried over to subsequent processing steps for additional frames in a set of frames being processed for global stabilization. In some implementations, group G may be predefined such that the same group G may be reused in processing of future sets of sequential image frames and thus may not need to be regenerated. This may occur, for example, where processing is applied to multiple sets of sequential images having the same frame size and utilizing the same motion group.

The system 200 may include a cumulative vector field module 240 configured to generate a cumulative mean global vector field W, representing the cumulative global movement from an initial frame $F_{init}$ to a current frame $F_{current}$. In operation, the cumulative vector field module 240 may receive or otherwise access or obtain the global motion deformation vector field $V_{current\ global}$ generated by the deformation field module 230. In various embodiments, the cumulative vector field module 240 utilizes a morph operation with diffeomorphisms for an iterative generation of the cumulative global vector fields $W_{cumulative}$. Inputting two successive morphisms: (1) a global motion deformation vector field $V_{current\ global}$ presenting the global diffeomorphism from the current frame $F_{current}$ to the previous frame $F_{current-1}$ and (2) a cumulative vector field $W_{cumulative-1}$ presenting a cumulative global diffeomorphism from the previous frame $F_{current-1}$ to an initial frame $F_{init}$. The calculous may go in reverse order from the first input $V_{current\ global}$ to the second input $W_{cumulative-1}$ to output a diffeomorphism $W_{cumulative}$ of the second input $W_{cumulative-1}$ to the first input $V_{global}$. This operation is not to be considered equivalent to the sum of the two vector fields (+ operation); rather, the operation is to "morph" the current vector field $V_{current}$ (shift its spatial arguments) by the second vector field $W_{cumulative-1}$, the reasoning for which is explained in more detail in Kalitzin et al. 2018a. For the 'morph' operation, the present disclosure utilizes "⊕" and thus as between the vector fields $V_1$ and $V_2$, the present application utilizes the following notation ($V_2 \oplus W_1$).

The system 200 may include a frame stabilization module 250 configured to generate stabilized frames wherein cumulative global movement has been removed. In operation, the frame stabilization module 250 may receive or otherwise access or obtain the cumulative global vector field $W_{cumulative}$ generated by the cumulative vector field module 240. The frame stabilization module 250 is configured to generate a stabilized frame and perform a stabilized frame writing process. For example, the frame stabilization module 250 may be configured to apply the cumulative global vector field $W_{cumulative}$ to the current image frame $F_{current}$, thereby removing cumulative global movement occurring up to this frame from the image frame. The frame stabilization module 250 may utilize the morph operation $F_{current} \oplus W_{cumulative}$ to deform the original current image frame $F_{current}$ by the cumulative global vector field $W_{cumulative}$ to output a stabilized frame $F_{current\ stable}$. Thus, inputting the cumulative global diffeomorphism $W_{cumulative}$ and original current image frame $F_{current}$ into the morph⊕operation morphs the cumulative global vector field $W_{cumulative}$ to the original current image $F_{current}$ to output a stabilized current image frame $F_{current\ stable}$ wherein the cumulative global movement has been removed, leaving the local movement already including in the current image frame $F_{current}$.

In some embodiments, the frame stabilization module 250 optionally includes an editing submodule 252. The editing submodule 252 may be configured to perform various editing tasks such as image smoothing or filtering of the stabilized images.

FIGS. 3-10 illustrate example methods for GMIS of image sequences according to various embodiments described herein. For brevity, the process flows of FIGS. 3-10 may be described with reference to the system 200 of FIG. 2; however, it will be appreciated that the methods are not limited to a particular system and in some embodiments, may be performed by other processing systems.

Figure 3:
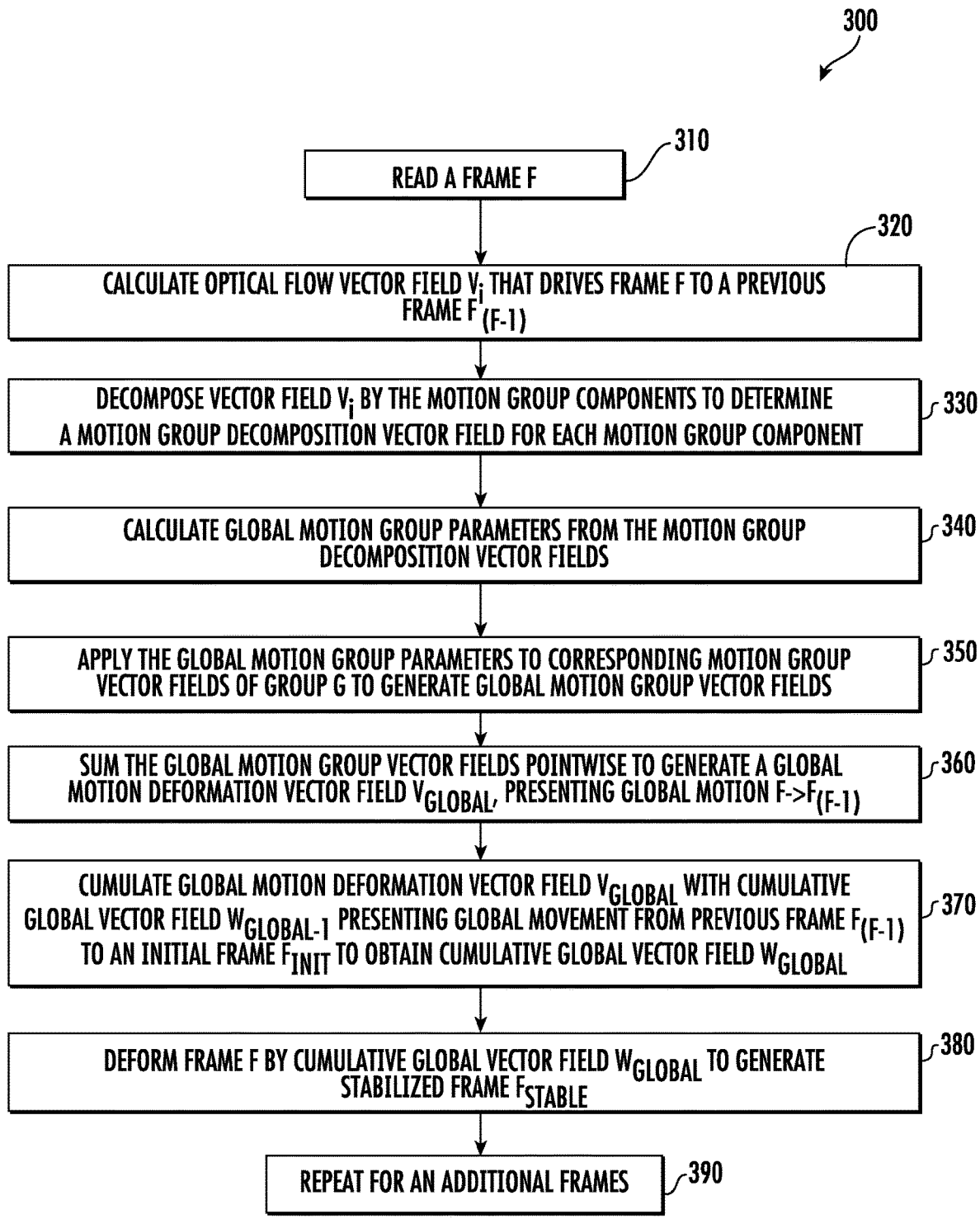
FIG. 3 illustrates a method of GMIS according to various embodiments described herein.

FIG. 3 illustrates an example of GMIS method 300 utilizing optical flow techniques according to various embodiments. The method may include reading an image frame F 310. In one example, frame F may be read by frame read module 210, as described with respect to FIG. 2 and elsewhere herein. Notably, it should be appreciated that a separate reading step may not be necessary and may include merely receiving the frame. Frame information may be prespecified, for example, such that reading the frame is not necessary.

The method 300 may also include calculating optical flow vector field $V_i$ that drives frame F to a previous frame $F_{(F-1)}$ 320.

Vector field $V_i$ may be decomposed by the motion group components to determine a motion group decomposition vector field for each motion group component 330, which may be elementary 2D linear transformations as described herein. For example, optical flow vector field $V_i$ including local and global motion may be decomposed by the motion group to determine a motion group decomposition vector field for each motion group component. If the motion group includes six motion group components such as X translation, Y translation, dilatation, rotation, shear out, and shear in, vector field $V_i$ may be decomposed into six motion group decomposition fields, one for each motion group component. Calculating optical flow vector field $V_i$ may include utilizing classical or modified optical flow calculations.

The method may also include calculating global motion group parameters from the motion group decomposition vector fields 340. The global motion group parameters may comprise calculated mean or average motion in each decomposition layer as calculated from each motion group decomposition vector field.

In some embodiments, frame F may also be segmented prior to generation of vector field $V_i$ such that vector field $V_i$ is a vector field that drives segmented frame F to a previous segmented frame $F_{(Fs-1)}$. Segmentation may be by any suitable manner, such as those described elsewhere herein. For example, frame F may be segmented by spectral/RGB values or ranges thereof. In one embodiment, the deformation field module 230, as described with respect to FIG. 2 and elsewhere herein, may generate optical flow vector field $V_i$, decompose $V_i$, and calculate global components to generate vector field V. For example, frames F and $F_{(F-1)}$, or segmented versions thereof, may be input into the modified optical flow algorithm SOFIA, described in more detail in Kalitzin et al. 2018a to generate optical flow vector field $V_i$ for decomposition and generation of calculation of global motion group parameters In a further embodiment, the process includes generating a group G of motion group vector fields representing inhomogeneous 2D linear transformations, one for each motion group of the motion group, which will typically be predetermined or otherwise input into the system. In one example, group G is generated including the six movement components described in FIG. 1.

As introduced above, the method 300 may include applying the global motion group parameters to corresponding motion group vector fields of group G to generate global motion group vector fields 350. When the global motion group parameters are applied to the motion group vector fields, the motion group vector fields are modified to present layers of global movement between two frames and thus represent the decomposition of the global movement portion of the optical flow vector field $V_i$.

The method may include, summing, pointwise, the global motion group vector fields to generate a global motion deformation vector field $V_{global}$, presenting global motion $F \rightarrow F_{(F-1)}$ 360.

The method 300 may also include cumulating global motion deformation vector field $V_{global}$ with a previously calculated cumulative global motion deformation vector field $W_{global-1}$ to obtain cumulative global motion deformation vector field $W_{global}$ 370. The previously calculated cumulative global motion deformation vector field $W_{global-1}$ presents global movement from the previous frame $F_{(F-1)}$ to an initial frame $F_{init}$. This processing may be performed by the cumulative vector field module 240, as described with respect to FIG. 2 and elsewhere herein, which may also include the utilization of the morph⊕operation. If the previous frame $F_{(F-1)}$ is the initial frame $F_{init}$, the previous cumulative global vector field will be zero as no previous global movement has been calculated and $F_{(F-1)}$ is the reference frame.

The method 300 may also include deforming frame F by cumulative global motion deformation vector field $W_{global}$ to generate stabilized frame $F_{stable}$ 380. Deforming frame F will typically include deforming the original frame rather than a segmented version. Thus, frame F, which includes both local and global movements, may be deformed by a cumulative global motion deformation vector field presenting cumulative global movement with local movement removed. The deformation removes the global movement to stabilize frame F to new frame $F_{stable}$, that replaces frame F in the image frame sequence. As frame F includes both local movement and global movement, which may also include accumulated global movement, morphing⊕frame F with the cumulative global motion deformation vector field $W_{global}$ retains local movement while removing global movement as well as accumulated global movement if $F_{(F-1)}$ was not the initial frame applied to the process 300. The above process 300 may be repeated 390 for processing of subsequent frames in a similar manner if desired.

Figure 4:
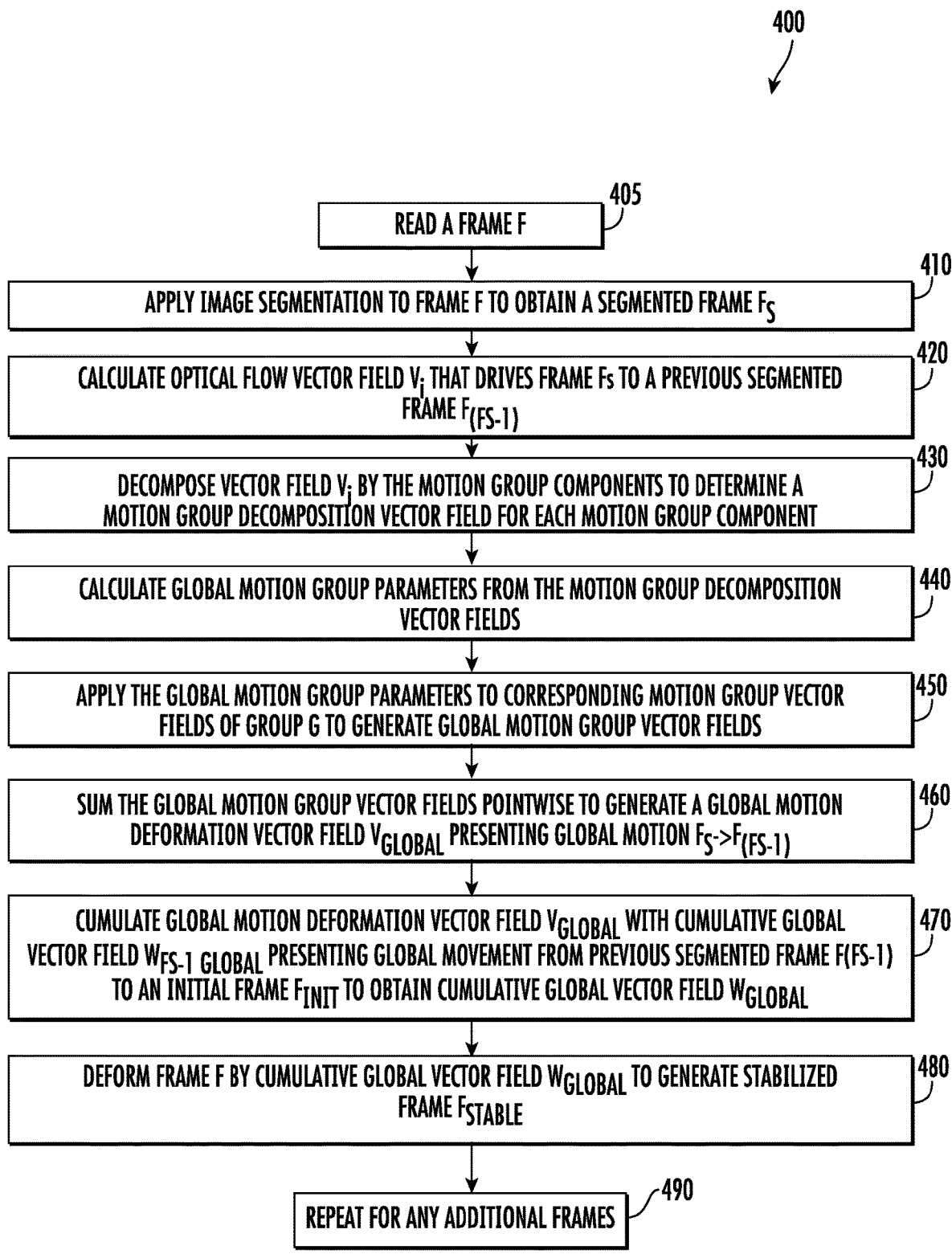
FIG. 4 illustrates a method of GMIS according to various embodiments described herein.

FIG. 4 illustrates an example of GMIS method 400, similar to method 300 described with respect to FIG. 3 and further including image stabilization. Briefly, the process 400 includes reading frame F 405, which may be read by the frame read module 210, as described with respect to FIG. 2 and elsewhere herein.

Image segmentation may be applied to frame F 410, e.g., by segmentation operator 220, to obtain a segmented frame $F_s$. For example, frame F may be segmented by any segmentation technique, such as any of those identified herein. The segmentation technique chosen may be beneficially directed to segmenting one or more ROI for processing. In various embodiments, segmentation may be spectral-based and utilize RGB values or ranges thereof, although grayscale may also be used.

The method 400 may include calculating an optical flow vector field $V_i$ that drives frame $F_s$ to a previous frame $F_{(Fs-1)}$ 420. Optical flow vector filed $V_i$ may be decomposed by the motion group components to determine a motion group decomposition vector field for each motion group component 430. Global motion group parameters may be calculated from the motion group decomposition vector fields 440.

Method 400 may also include applying the global motion group parameters to corresponding motion group vector fields of group G to generate global motion group vector fields 450 and Summing the global motion group vector fields pointwise to generate a global motion deformation vector field $V_{global}$ presenting global motion $F_s \rightarrow F_{Fs-1}$ 460, in a manner similar to that described above with respect to FIG. 3 and elsewhere herein.

In one embodiment, the deformation field module 230, as described with respect to FIG. 2 and elsewhere herein, may generate optical flow vector field $V_i$ 420, decompose $V_i$ 430, and calculate global components 440 to generate global deformation vector field $V_{global}$, e.g., utilizing classical optical flow, the SOFIA algorithm, or other modified optical flow technique. The deformation field module 230 may also apply the parameters to the motion group vector fields of group G 450 and sum the motion group vector fields to generate global motion deformation vector field $V_{global}$ 460.

The motion group G of 2D transformations, such as the elementary transformations identified in FIG. 1, may also be generated in the method 400 or a previously generated group G generated with respect to the processing of a set of frames including frame F or an analogous method processing similarly sized frames. In a further embodiment, the process may include generating the group G of inhomogeneous elementary 2D linear transformations, such as the six elementary transformations identified in FIG. 1.

Global motion deformation vector field $V_{global}$ may be cumulated with cumulative global vector field $W_{Fs-1\ global}$ presenting global movement from previous segmented frame $F_{(Fs-1)}$ to an initial frame $F_{init}$ to obtain cumulative global vector field $W_{global}$ 470. This process may utilize the morph operation $V_{global} \oplus W_{global-1}$ and be performed by the cumulative global vector field module 240. As noted above, if the previous frame $F_{(F-1)}$ is the initial frame $F_{init}$, the previous cumulative global motion deformation vector field will be zero. Frame F may be deformed by the cumulative global motion deformation vector field $W_{global}$ to generate stabilized frame $F_{stable}$ with accumulated global movement removed 480. The above process 400 may be repeated 490 for processing of subsequent frames in a similar manner if desired.

Figure 5:
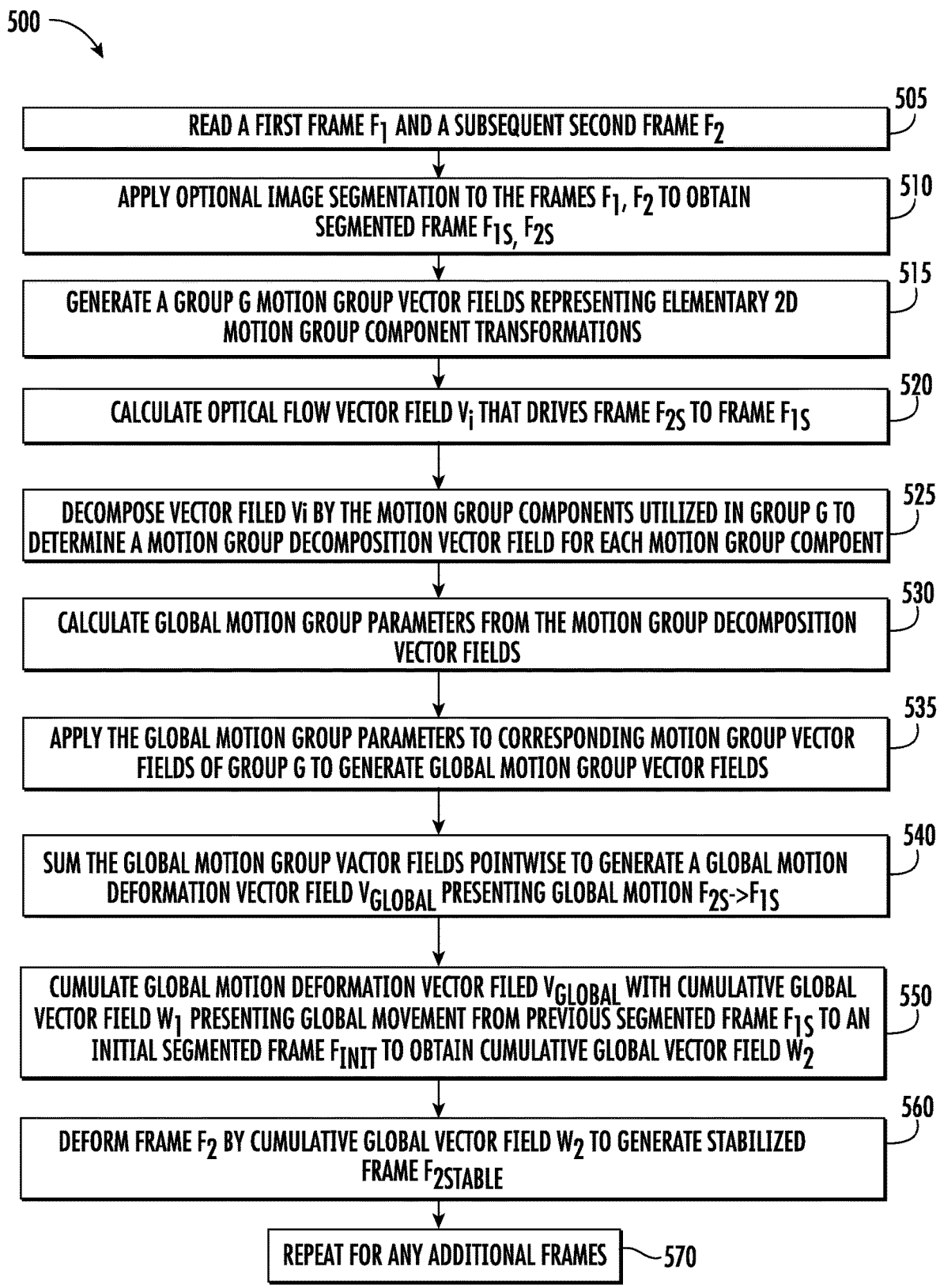
FIG. 5 illustrates a method of GMIS according to various embodiments described herein.

FIG. 5 illustrates an example of GMIS method 500 similar to the processes described with respect to FIGS. 3 & 4 and further including reading and segmenting multiple frames and generating group G. Briefly, the process includes reading first frame $F_1$ and a subsequent second frame $F_2$ 505, which may be read by the frame read module 210, as described with respect to FIG. 2 and elsewhere herein. Image segmentation may be applied to the frames $F_1$, $F_2$ 510, e.g., by segmentation operator 220, to obtain a segmented frames $F_{1s}$, $F_{2s}$. For example, frames $F_1$ and $F_2$ may be segmented by any segmentation technique, such as any of those identified herein. The segmentation technique chosen is preferably directed to segmenting one or more ROI for processing. In various embodiments, segmentation may be spectral-based and utilize RGB values or ranges thereof, although grayscale may also be used. A group G of 2D transformations, such as the 6 elementary transformations identified in FIG. 1, may be generated 515.

Frames $F_2$ and $F_1$ may be analyzed to calculate an optical flow vector field $V_i$ that drives frame $F_{2s}$ to frame $F_{1s}$ 520. The vector field $V_i$ may be decomposed by the motion group components utilized in group G to determine a motion group decomposition vector field for each motion group component 525. The resulting layers may be analyzed. For example, global motion group parameters may be calculated from the motion group decomposition vector fields 530. The global motion group parameters may be applied to corresponding motion group vector fields of group G to generate global motion group vector fields 535. The global motion group vector fields may be summed pointwise to generate a global motion deformation vector field $V_{global}$ presenting global motion $F_{2s}$->$F_{1s}$ 540. In one embodiment, the deformation field module 230, as described with respect to FIG. 2 and elsewhere herein, may generate optical flow vector field $V_i$ 520, decompose $V_i$ by the motion group components 525, calculate global motion group parameters 530, apply the parameters to the motion group vector fields of group G 535, and sum the motion group vector fields to generate global motion deformation vector field $V_{global}$ 540, as described above with respect to FIGS. 3-4.

Global motion deformation vector field $V_{global}$ may be cumulated with cumulative global vector field $W_1$ presenting global movement from previous segmented frame $F_{1s}$ to an initial frame $F_{init}$ to obtain cumulative global vector field $W_2$ 550. This process may utilize the morph operation $V_{global} \oplus W_1$ and be performed by the cumulative global vector field module 240. As noted above, if the first frame $F_1$ is the initial frame $F_{init}$, the previous cumulative global motion deformation vector field will be zero. Frame $F_2$ may be deformed by the cumulative global motion deformation vector field $W_2$ to generate stabilized frame $F_{2stable}$ with accumulated global movement removed 570. The above process 500 may be repeated 570 for processing of subsequent frames in a similar manner if desired.

Using generally applicable notation with respect to the systems and methods described herein, the deformation field module 230 may be configured for optical flow parameter reconstruction. The deformation field module 230 may be configured to generate a global motion deformation vector field that presents the mean global motion from $F_2$ to $F_1$ corresponding to a vector field that drives frame $F_2$ to frame $F_1$. In one example, the global motion deformation vector field may be assembled from a plurality of modified motion group vector fields, such as global motion group vector fields, each presenting a mean motion component with respect to its respective motion component. In a further or another example, the deformation field module 230 may calculate a global motion group parameter for each motion group component of the motion group, wherein each parameter corresponds to global motion in a component layer of the motion group and corresponds to global motion with the layer relative to a vector field that drives frame $F_2$ to frame $F_1$. The deformation field module 230 may also apply optical flow techniques as described above and elsewhere herein to generate the global motion deformation vector field.

Thus, the deformation field module 230 may decompose an optical flow vector field that drives frame $F_2$ to frame $F_1$ into elementary 2D motion component vector fields, each presenting a decomposed layer of elementary motion within a plane. The deformation field module 230 may calculate global motion parameters representing magnitudes of motion calculated for each component of motion in the motion group. The global motion parameters may represent mean global motion values within each layer. These global motion group parameters may be applied to the motion group vector fields of group G to generate global motion group vector fields. The resulting global motion group vector fields may be summed pointwise to generate a summed vector field, such as a global motion deformation vector field presenting global motion $F_2$->$F_1$. For example, optical flow vector field $V_i$, representing $F_1$<-$F_2$, may be decomposed into predefined 2D motion group layers corresponding to the layers of group G. A total average of each layer may then be calculated and applied to group G motion group vector fields to obtain global motion group vector fields for each transformation layer that represents the global movement within each layer for the current step. The layers may be reassembled to output the global motion deformation vector field $V_{global}$ that represents magnitudes of global motion $F_1$<-$F_2$ with local movement removed. It is noted that generation of vector field $V_i$ and decomposition of the same into component layers for calculating global motion group parameters may be performed such that $V_i$ is not actually generated into visual output, but rather pixels or segmented pixels of $F_1$ and $F_2$ may be analyzed for translations with respect to the predefined 2D motion component layers to calculate global motion group parameters for each layer. The global motion group parameter for each layer may be applied, e.g., multiplied, with the corresponding motion group vector field of group G. The mean vector fields may then be summed to generate the global motion deformation vector field $V_{global}$, containing the global motion from $F_2$->$F_1$. Therefore, $V_{global}$ may be the vector summing the mean of the elementary motions of each pixel.

Figure 6:
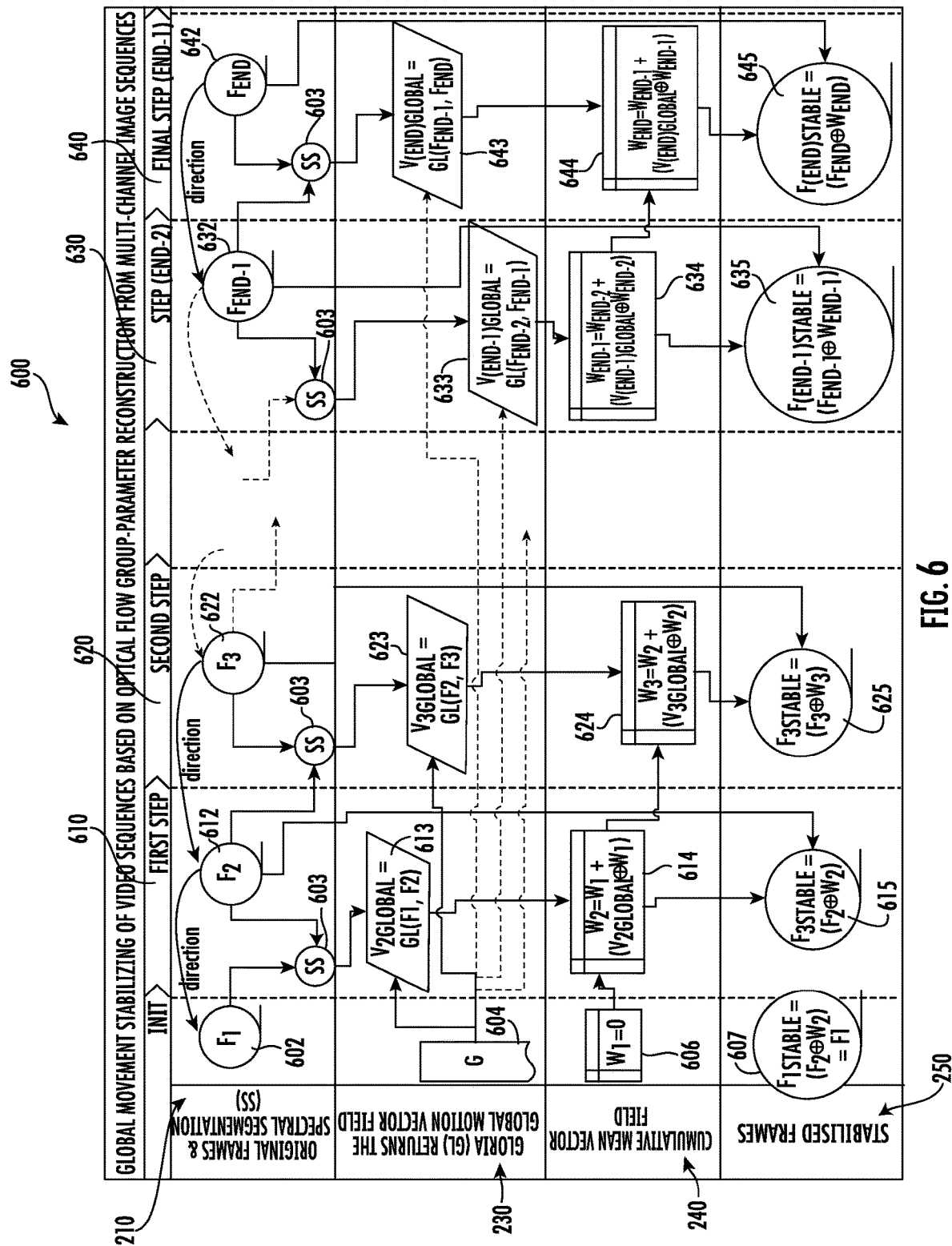
FIG. 6 illustrates a process flow for GMIS according to various embodiments described herein.

As noted above, GLORIA may be used to generate global motion deformation vector field $V_{global}$ by calculating/estimating the global motion group parameters corresponding to motion group decomposition vector fields in the optical flow examples but without calculating the optical flow vector field $V_i$ at each point of the frame by reconstructing the global parameters for the group of elementary 2D motions leading from $F_2$ to $F_1$. The global motion group parameters define a mean value or "common part" of the motion for each of the elementary 2D motion components of the motion group. The global motion group parameters may be represented by mean motion values that correspond to each of the elementary 2D motion components of the corresponding elementary vector field. The global motion group parameters correspond to the part of the movement, which is applied to all the pixels in the frame or in the ROI. Therefore, if the global motion group parameter values are deleted from frame $F_2$, the result would be to remove the global motion only, while leaving the local motions. In furtherance of this outcome, GLORIA multiplies the obtained global motion group parameters values, e.g., six numbers that correspond to six elementary 2D motion components, with the motion group G to obtain the transformation group of global motion group vector fields containing the mean motion/global motion for each motion group component. GLORIA may then sum the global motion group vector fields into the global motion deformation vector field $V_{global}$, containing the 'global' motion from $F_2$->$F_1$. Therefore, global motion deformation vector field $V_{global}$ may be the vector summing the mean of the elementary 2D motions in each pixel. Global motion deformation vector field $V_{global}$ may be cumulated with the previous cumulative global motion deformation vector field $W_1$ to generate cumulative global motion deformation vector field $W_2$. Frame $F_2$ may be deformed by cumulative global vector field $W_2$ to generate stabilized frame $F_{2stable}$ FIG. 6 schematically illustrates an example process flow for GMIS avoiding calculation of the optical flow vector field $V_i$ at each point in the frame according to various embodiments. While the process 600 is shown including four steps, it is to be appreciated that additional or fewer steps may be included.

The process 600 includes an initiation (INIT) step 601 wherein the frame read module 210 performs an original frame reading process 602 of an initial original frame $F_1$. In the INIT step 601 of the illustrated example, the original frame is first frame $F_1$, which is also a reference frame.

The process 600 may optionally include a pre-processing step 603. For example, in embodiments including image segmentation, $F_1$ may be passed to a segmentation operator "SS" that identifies regions of interest (ROI). When image segmentation is used, $F_1$ is a processed by the segmentation operator SS which outputs processed $F_1$, a segmented image or segmented image data of the original frame $F_1$.

A group representation of elementary 2D motion component vector fields, e.g., motion group vector fields of group G, may be generated 604 having the size of $F_1 \times$number corresponding to the elementary motion group components of the motion group, which in this example is six. Accordingly, in various embodiments, the group representation G of the structural tensor may be built using the following six "elementary" 2D motion component transformations: 2 translations, dilation, rotation, 2 shear transforms, see, e.g., FIG. 1. With original $F_1$ being the reference frame in this example, the cumulative global motion deformation vector field $W_1$ is zero 606. The first stabilized frame $F_{stable}$ is set to $F_{1stable}=(F_1 \oplus W_1)=F_1$ 607, and, thus, original $F_1$ is, therefore, a reference frame. $F_{1stable}$ may be a copy of the reference frame $F_1$ in a stabilized sequence. It is to be appreciated that while the example process 600 is illustrated as having an initiation INIT step, portions of this INIT step may be executed during execution of the first step 610. That is the various steps of the INIT step 601 may be performed before or during first step 610, such as when needed for execution of a step in first step 610. For example, pre-processing 603 of frame $F_1$ may be performed after group G generation 604 and/or reading of $F_2$ 611. Generation of group G 604 may be performed during the INIT step 601, first step 610, and/or other steps. As noted above, group G generation 604 is preferably performed at initiation or otherwise prior to application of global motion group parameters to the motion group vector fields of group G; however, in some embodiments, group G may be pre-generated as being applicable to the frame size of the set of frames to be processed in process 600 and particular motion group components of the motion group from which to decompose the complex motion, and, thus, do not need to be specifically generated for process 600. While typically placing an unnecessary cost on processing resources, group G could also be generated in multiple steps throughout process 600.

At the first step 610, the frame read module 210 may read a second frame $F_2$ 611 and pass it to the segmentation operator SS for optional pre-processing 603. When image segmentation is used, the segmentation operator SS outputs processed $F_2$ as a segmented image or image data of the frame $F_2$. As image segmentation is optional, the illustrated process uses the $F_2$ designation to refer to the second original frame $F_2$ or the processed or segmented original frame $F_2$.

The frames $F_1$ and $F_2$, or their segmentation processed outputs, if segmentation is used, may be passed to the deformation field module 230 for optical flow group parameters reconstruction 613. Note that $F_1$ may be passed to the deformation field module 230 by the frame read module 210 or segmentation operator SS in the INIT step 601. In this example, the segmentation processed frames $F_1$, $F_2$ are passed to the GLORIA "GL" algorithm to obtain global vector field $V_{2global}$, which presents a global diffeomorphism from $F_2$ to $F_1$. As introduced above, GLORIA uses the preliminary generated group G of the six elementary 2D motion group vector fields. Each motion group vector field (diffeomorphism) corresponds to one of the six elementary 2D motion group components of the motion group. As introduced above, group G is used for decomposition of a complex activity into six 2D elementary components of the movement. The optical flow is shown going reverse with respect to time or order of frames. Frames $F_1$ and $F_2$ may be input into GLORIA, which applies a calculus that goes in reverse order from the second input $F_2$ to the first input $F_1$ or $F_1 \leftarrow F_2$, to output vector field $V_{2global}$. In other words, GLORIA decomposes a vector field from $F_1 \leftarrow F_2$ by the motion group transformations to obtain the total movement at each point as a superposition of the "elementary" transformations from group G, which results in the vector field from $F_1 \leftarrow F_2$ decomposed into six layers. GLORIA then calculates the total average of each layer (2×translation, 1×dilation, 1×rotation, 2×shear) to give a global motion deformation vector field $V_{2global}$ that represents the global movement from $F_1 \leftarrow F_2$.

The deformation field module 230 may pass the global motion deformation vector field $V_{2global}$ to the cumulative vector field module 240 for the generation of a cumulative global motion deformation vector field $W_2$ 614. For example, using the global vector field $V_{2global}$ of $F_1 \leftarrow F_2$, the cumulative vector field module 240 may generate a cumulative global motion deformation vector field $W_2$, which represents the cumulative global movement up to this point of the process 600. In the illustrated process 600, the cumulative vector field module 240 calculates $W_2 = W_1 + (V_{2global} \oplus W_1)$, which utilizes global motion deformation vector field $V_{2global}$ and previous cumulative global motion deformation vector field $W_1$, determined at the INIT step, for an iterative generation of cumulative global motion deformation vector field $W_2$. $W_2$ is the cumulative global motion deformation vector field of the present iteration and combines the global movements calculated through previous INIT step, which is $W_1$ and which is set to zero, with those calculated for the first step. The cumulative character of the operator is given by the sign +. The morph $\oplus$ operation shows the operation with diffeomorphisms. In this case, two successive morphisms $V_{2global}$ and $W_1$ are input into the function $W = V_{2global} \oplus W_1$ and the calculus goes in reverse order from the second to the first input $V_{2global} \leftarrow W_1$ to output W, the resulting diffeomorphism from $V_{2global} \leftarrow W_1$. The operation is not equivalent to the sum of the two vector fields, as the operation is to "morph" the first global vector field $V_{2global}$ (shift its spatial arguments) by the second vector field $W_1$, which is explained in more detail in Kalitzin et al. 2018a.

The cumulative vector field module 240 may provide or transmit the cumulative global motion deformation vector field $W_2$ to the frame stabilization module 250 for the generation of a stable frame $F_{2stable}$ 615. The frame stabilization module 250 is configured to generate a stabilized frame. For example, the frame stabilization module 250 may be configured to remove the cumulative global movement, utilizing cumulative global motion deformation vector field $W_2$, from frame $F_2$ to generate a stable frame $F_{2stable}$, corresponding to the original frame $F_2$ with the global movement up to this point ($F_1$ to $F_2$) removed. The stabilized frame $F_{2stable}$ may be obtained by applying/removing all the global movements calculated so far. In the illustrated process 600, the frame stabilization module 250 deforms the original second frame $F_2$ by the cumulative global motion deformation vector field $W_2$ using morph⊕operation ($F_2 \oplus W_2$). The stabilized second frame $F_{2stable}$ may replace frame $F_2$ in the stabilized sequence. The frame stabilization module 250 may further perform a stabilized frame writing process wherein the new frame is written in a new video file to produce a stabilized video comprising a series of stabilized frames. Such a writing process may include writing the frame in a stabilized video file using the same timestamp as in the original video file. The stabilized second frame $F_{2stable}$ may be generated from original frame $F_2$, or a segmented frame $F_2$ if an output of a stabilized segmented image is desired.

The process 600 may include a second step 620 similar to the first step 610. At the second step 620, the frame read module 210 may read a third frame $F_3$ 622 and transmits it to the segmentation operator 220 for image segmentation. The segmentation operator 220 may segment the image according to predetermined criteria and output a processed frame $F_3$ as a segmented image or image data of the original frame $F_3$.

The processed frames $F_2$ and $F_3$ may be provided or transmitted to the deformation field module 230 for optical flow group parameters reconstruction 623. The segmentation processed frames $F_2$, $F_3$ may be processed by the deformation field module 230 utilizing the GLORIA algorithm to obtain global motion deformation vector field $V_{3global}$, presenting a global diffeomorphism from $F_3$ to $F_2$. Briefly, frames $F_2$ and $F_3$ may be input into GLORIA "GL", which applies a calculus that goes in reverse order from the second input $F_3$ to the first input $F_2$, or $F_2 \leftarrow F_3$, to output $V_{3global}$. GLORIA may calculate the global motion group parameters for each motion group component (2×translation, 1×dilation, 1×rotation, 2×shear), apply the global motion group parameters to respective motion group vector fields of group G, and sum pointwise the resulting six global motion group vector fields to generate global motion deformation vector field $F_{3global}$, that represents the global movement from $F_2 \leftarrow F_3$. GLORIA may be said to perform the above operations at the same time.

The deformation field module 230 may transmit the global motion deformation vector field $V_{3global}$ to the cumulative vector field module 240 for the generation of a cumulative global motion deformation vector field $W_3$ 624. For example, using the global motion deformation vector field $V_{3global}$ of $F_2 \leftarrow F_3$, the cumulative vector field module 240 generates a cumulative global motion deformation vector field $W_3$, which represents the cumulative global movement up to this point. The cumulative vector field module 240 calculates $W_3 = W_2 + (V_{3global} \, W_2)$, which utilizes $V_{3global}$ and $W_2$, determined at the previous step, for an iterative generation of cumulative global motion deformation vector field $W_3$. The two successive global morphisms $V_{3global}$ and $W_2$ are input into the function $W = (V_{3global} \oplus W_2)$ and the calculus goes in reverse order from the second to the first input $V_{3global} \leftarrow W_2$ to output W, the resulting diffeomorphism $V_{3global} \leftarrow W_2$, which is cumulated with $W_2$ to obtain cumulative global motion deformation vector field $W_3$. Thus, $W_3$ represents the vector field that when applied or morphed to $F_3$ removes accumulated global movement from $F_1$ to $F_3$, at least in segmented regions as applied in the illustrated process, while retaining local movements.

The cumulative vector field module 240 may transmit the cumulative global motion deformation vector field $W_3$ to the frame stabilization module 250 for the generation of a stable frame $F_{3stable}$ 625. The frame stabilization module 250 may deform the original third frame $F_3$ by the cumulative global motion deformation vector field $W_3$ using morph⊕operation.

The above process 600 proceeds to generate stabilized frames for successive frames, thereby removing cumulative global movement from respective original frames.

FIG. 6 further illustrates the process 600 applied to two final successive frames and may be similar to the first step 610 and second step 620.

In step$_{(end-2)}$ 630, the frame read module 210 reads the second to last frame $F_{(end-1)}$ 632 and transmits it to the segmentation operator 220 for pre-processing 603, e.g., image segmentation in this embodiment. The segmentation operator 220 segments the image according to the predetermined criteria and outputs a processed $F_{(end-1)}$ as a segmented image or image data of the original frame $F_{(end-1)}$.

The processed frame $F_{(end-1)}$ may be transmitted to the deformation field module 230 for optical flow group parameters reconstruction 633. The segmentation processed frame $F_{(end-1)}$ and previous processed frame $F_{(end-2)}$ are processed by the deformation field module 230 utilizing the GLORIA algorithm to obtain global motion deformation vector field $V_{(end-1)global}$, presenting a diffeomorphism from $F_{(end-1)}$ to $F_{(end-2)}$. As noted above, frames $F_{(end-2)}$ and $F_{(end-1)}$ are input into GLORIA, which applies a calculus that goes in reverse order from the second input $F_{(end-1)}$ to the first input $F_{(end-2)}$, or $F_{(end-2)} \leftarrow F_{(end-1)}$, to output $V_{(end-1)global}$.

The deformation field module 230 transmits the global motion deformation vector field $V_{(end-1)global}$ to the cumulative vector field module 240 for the generation of a cumulative global motion deformation vector field $W_{(end-1)}$ 634. Using the global motion deformation vector field $V_{(end-1)}$ of $F_{(end-2)} \leftarrow F_{(end-1)}$, the cumulative vector field module 240 generates a cumulative global motion deformation vector field $W_{(end-1)}$, which represents the cumulative global movement up to this point. The cumulative vector field module 240 calculates $W_{(end-1)} = W_{(end-2)} + (V_{(end-1)} \oplus W_{(end-2)})$, which utilizes $V_{(end-1)}$ and $W_{(end-2)}$, determined at the previous step, for iterative generation of cumulative global motion deformation vector field $W_{(end-1)}$. The two successive morphisms $V_{(end-1)}$ and $W_{(end-2)}$ are input into the operation $W = (V_{(end-1)} \oplus (W_{(end-2)})$ and as before the calculus goes in reverse order from the second to the first input $V_{(end-1)} \leftarrow W_{(end-2)}$ to output W, the resulting diffeomorphism $V_{(end-1)} \leftarrow W_{(end-2)}$, which is cumulated with $W_{(end-2)}$ calculated at the previous step$_{(end-2)}$, not shown, to obtain cumulative global motion deformation vector field $W_{(end-1)}$.

The cumulative vector field module 240 transmits the cumulative global motion deformation vector field $W_{(end-1)}$ to the frame stabilization module 250 for the generation of a stable frame $F_{(end-1)stable}$ 635. The frame stabilization module 250 deforms the original frame $F_{(end-1)}$ by the cumulative global motion deformation vector field $W_{(end-1)}$ using morph⊕operation.

In the subsequent step$_{(end-1)}$ 240, the frame read module 210 reads the frame $F_{(end)}$ 642 and transmits it to the segmentation operator 220 for pre-processing 603, e.g., image segmentation in this example. The segmentation operator 220 segments the image according to the predetermined criteria and outputs a processed $F_{(end)}$ as a segmented image or image data of the original frame $F_{(end)}$.

The processed frame $F_{(end)}$ may be transmitted to the deformation field module 230 for optical flow group parameters reconstruction 643. The segmentation processed frame $F_{(end)}$ and previous processed frame $F_{(end-1)}$ are processed by the deformation field module 230 utilizing the GLORIA algorithm to obtain global motion deformation vector field $V_{(end)global}$, presenting a diffeomorphism from $F_{(end-1)}$ to $F_{(end-2)}$.

The deformation field module 230 transmits the global motion deformation vector field $V_{(end)global}$ to the cumulative vector field module 240 for the generation of a cumulative global motion deformation vector field $W_{(end)}$ 644. Using the global motion deformation vector field $V_{(end)global}$ of $F_{(end-1)} \leftarrow F_{(end)}$, the cumulative vector field module 240 generates a cumulative global motion deformation vector field $W_{(end)}$, which represents the cumulative global movement up to this point, which is from $F_1$ to $F_{(end)}$. The cumulative vector field module 240 calculates $W_{(end)} = W_{(end-1)} + (V_{(end)} \oplus (W_{(end-1)}))$, which utilizes $V_{(end)}$ and $W_{(end-1)}$ for iterative generation of cumulative global motion deformation vector field $W_{(end)}$. The two successive morphisms $V_{(end)}$ and $W_{(end-1)}$ are input into the function $W = (V_{(end)} \oplus (W_{(end-1)}))$ to output W, the resulting diffeomorphism $V_{(end)} \leftarrow W_{(end-1)}$, which is cumulated with $W_{(end-1)}$ calculated at the previous step$_{(end-1)}$ to obtain cumulative global motion deformation vector field $W_{(end)}$.

The cumulative vector field module 240 transmits the cumulative global motion deformation vector field $W_{(end)}$ to the frame stabilization module 250 for the generation of a stable frame $F_{(end)stable}$ 635. The frame stabilization module 250 deforms the original frame $F_{(end)}$ by the cumulative global motion deformation vector field $W_{(end)}$ using morph operation to generate stable frame $F_{(end)stable}$ having accumulated global movement removed from segmented portions while retaining local movement throughout the image. $F_{(end)stable}$ may replace frame $F_{(end)}$ in the stabilized frame sequence, e.g., the stabilized image frame sequence may include the initial frame $F_1$ followed by subsequent stabilized frames $F_{2stable}$, $F_{3stable}$, $F_{(end-1)stable}$, $F_{(end)stable}$.

The present global stabilization processes may be applied directly to video images as read by the frame read module 210 and/or their representative data formats. The resulting image frame sequences generated by the global stabilization processes described herein may output to visual, e.g., video, format or output in representative data format. Such output formats are suitable for application of further analysis that may be applied directly to stabilized output video or data format.

In one embodiment, given consequent frames frame $F_2$ and frame $F_1$ a method of image stabilization may include calculating global motion group parameters for each 2D motion group component represented in G. The method may further include applying the global motion group parameters to respective motion group vector fields in a group G. The method may further include summing, pointwise, the resulting global motion group vector fields to generate a global motion deformation vector field $V_{2global}$ that presents global motion $F_2 \rightarrow F_1$. In one example, group G comprises the motion group vector fields described with respect to FIG. 1 having size parameters suitably scaled to the frames $F_1$ and $F_2$. The method may also include using $V_{2global}$ to update a cumulative global motion deformation vector field $W_1$ presenting cumulative global motion between $F_1$ and an initial frame $F_{init}$, wherein the cumulation cumulates the calculated global movements vector fields so far $W_2 = W_1 + (V_{2global} \oplus W_1)$. The method may also include applying the updated cumulated global motion deformation vector field $W_2$ to frame $F_2$ to obtain $F_{2stable} = (F_2 \oplus W_2)$ to generate a stable frame $F_{2stable}$. $F_2$ may be morphed or deformed by $W_2$.

In a further example, the method may further include repeating the above for subsequent images. In the above or another example, the method may further include saving and sequencing stabilized images. In one example, the sequenced stabilized images may be saved with timestamps corresponding to the original frames. In the above or another example, the method may further include generating group G. In any of the above examples or another example, the method may include reading frames $F_1$ and $F_2$. In any of the above examples or another example, the method may include applying image segmentation. In any of the above examples or another example, the method may include applying image editing. In any of the above examples or another example, the method may include utilizing optical flow techniques to generate a vector field that drives $F_2$ to $F_1$ and decomposing the vector fields by motion group components to generate motion group decomposition vector fields from which motion group parameters may be calculated. Alternatively, the method may include utilizing an algorithm such as GLORIA that avoids the costly optical flow calculations at every point of the frames. In any of the above or another example, the method further includes applying the method to color images. In any of the above or another example, the method further includes applying the method to grayscale images.

Figure 7A:
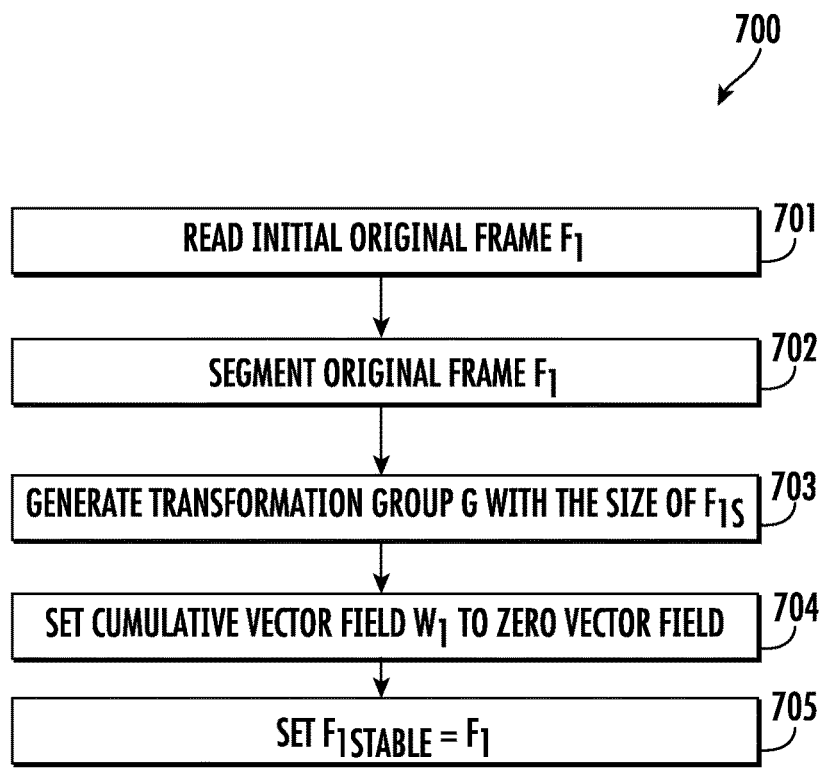
FIG. 7A illustrates an initiation method for GMIS applicable to the process flow of FIG. 6 according to various embodiments described herein.
Figure 7B:
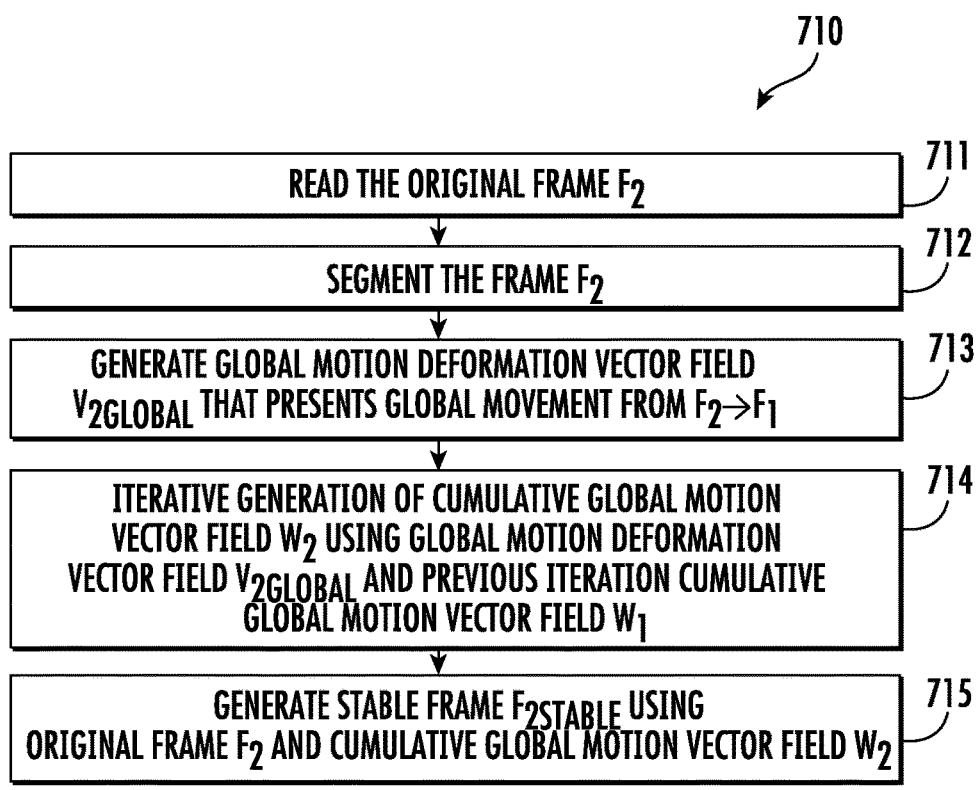
FIG. 7B illustrates a post-initiation method for GMIS applicable to the process flow of FIG. 6 according to various embodiments described herein.
Figure 7C:
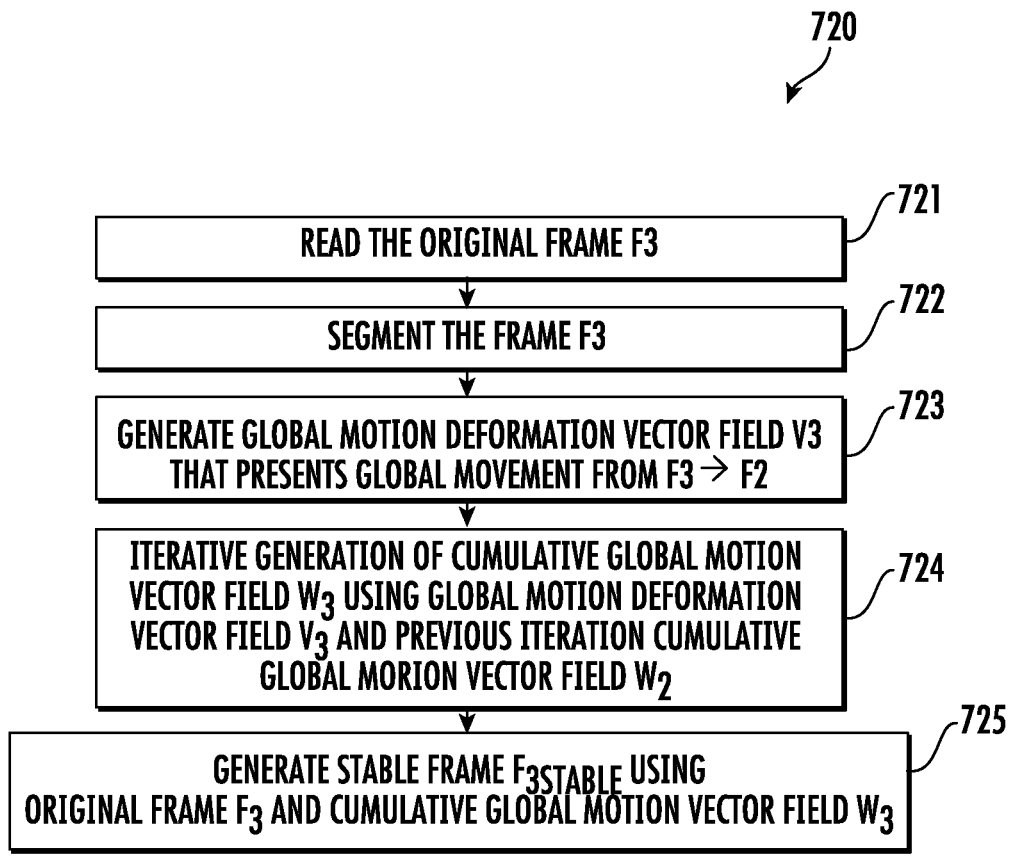
FIG. 7C illustrates a post-initiation method for GMIS applicable to the process flow of FIG. 6 according to various embodiments described herein.

FIGS. 7A-7C provide methods for performing global stabilization processing, and which may also be utilized in image processing according to various embodiments of the process flow described with respect to FIG. 6.

With reference to FIG. 7A, an initiation (INIT) method 700 may include reading an image frame $F_1$ 701. The method 700 may further include segmenting the frame $F_1$ according to any suitable segmentation method 702, such as any of those described herein, e.g., spectral segmentation, to produce a segmented frame $F_{1s}$. An elementary 2D motion component transformation group G may also be generated 703 including motion group vector fields. The group G may be generated having motion group vector fields having the size of segmented frame $F_{1s} \times N$, where N is the number of motion group components of the applicable motion group, which also corresponds to the number of elementary transformations in group G, e.g., $F_{1s} \times 6$. As noted above, group G may also include size, e.g., group G may be considered a matrix with a size of $H \times W \times N$, wherein H is frame height in pixels, W is frame width in pixels, and N is the number of motion component transformations in group G. Thus, with reference back to FIG. 1, the group G with six motion component transformations may be notated as $11 \times 21 \times 6$. The method may also include setting a cumulative global motion deformation vector field $W_1$ to zero vector field 704. However, this step of INIT may be performed in a subsequent processing step and/or may be passive such that $W_1$ is zero by default. A stabilized frame $F_{1stable}$ may be set to equal $F_1$ in a stabilized sequence including subsequent stabilized frames 705.

In one configuration utilizing the system 200 described with respect to FIG. 2 according to the method 700 of FIG. 7A, the frame read module 210 may read frame $F_1$ and transmit $F_1$ to the segmentation operator 220. The segmentation operator 220 may segment frame $F_1$ to generate segmented frame $F_{1s}$. The deformation field module 230 may generate the group G transformations. The Cumulative vector field module may set cumulative global motion deformation vector field $W_1$ to zero vector field, and the frame stabilization module 250 may set $F_{1stable}$ to $F_1$ or a copy thereof.

With reference to FIG. 7B, the method 710 may include reading a subsequent frame $F_2$ 711 and optionally segmenting the image consistent with the segmentation of original frame $F_1$ 712. The method 710 may further include generating a vector field $V_{2global}$ presenting the global diffeomorphism from $F_2$ to $F_1$ 713. The method 710 may also include iterative generation of cumulative global motion deformation vector field $W_2$ using $V_{2global}$ and $W_1$ to combine any global movements calculated prior to frame $F_2$ with the global movement calculated for $F_2$ to $F_1$ 714. In this case, $W_1$ has been set to zero because frame $F_1$ is the initial frame. The method 710 may also include generating a stabilized frame $F_{2stable}$ using the original frame $F_2$ and $W_2$ 715. Stabilized frame $F_{2stable}$ includes local movements from frame $F_1$ with accumulated global movement removed and replaces frame $F_2$ in the sequence.

In one configuration utilizing the system 200 described with respect to FIG. 2 according to the method 710 of FIG. 7B, the frame read module 210 may read frame $F_2$ and transmit it to the segmentation operator 220 for segmentation. The segmentation operator 220 may transmit segmented frames $F_{1s}$ and $F_{2s}$ to the deformation field module 230. The deformation field module 230 may generate vector field $V_{2global}$ by inputting $F_{1s}$ and $F_{2s}$ into the GLORIA algorithm to calculate the global motion group parameters, apply the parameters to the motion group vector fields of group G, and sum the resulting global motion group vector fields—The deformation field module 230 may transmit vector field $V_{2global}$ to the cumulative vector field module 240 for an iterative generation of the cumulative global motion deformation vector field $W_2$. For example, the cumulative vector field module 240 may input vector fields $V_{2global}$ and $W_1$ in the morph operation ($V_2 \oplus W_1$) to combine previously calculated cumulative global movements ($W_1$) with the global movements calculated ($V_{2global}$) representing $F_{2s}$ to $F_{1s}$. The cumulative vector field module 240 may transmit the cumulative global motion deformation vector field $W_2$ to the frame stabilization module 250. Original frame $F_2$ may also be directly or indirectly transmitted to the frame stabilization module 250. The frame stabilization module 250 may use the cumulative vector field $W_2$ and original frame $F_2$ to morph original frame $F_2$ by vector field $W_2$ to generate stabilized frame $F_{2stable}$ having cumulated global movement removed. For example, the frame stabilization module 250 may deform original frame $F_2$ using the morph operation $F_{2stable} = (F_2 (W_2))$.

With reference to FIG. 7C, the method 720 may include reading frame $F_3$ 721 and optionally segmenting the image in a manner consistent with the segmentation of original frames $F_1$ and $F_2$ 722. The method 720 may further include generating a vector field $V_{3global}$ presenting the global diffeomorphism from $F_3$ to $F_2$ 723. The method 720 may also include iterative generation of cumulative global motion deformation vector field $W_3$ using $V_{3global}$ and $W_2$ to combine any global movements calculated prior to frame $F_3$ with the global movement calculated for $F_3$ to $F_2$ 724. The method 720 may also include generating a stabilized frame $F_{3stable}$ using the original frame $F_3$ and $W_3$ 725. Stabilized frame $F_{3stable}$ may include local movements from frame $F_2$ with accumulated global movement from $F_{3s} \rightarrow F_{1s}$ removed and may replace frame $F_3$ in the stabilized sequence.

In one configuration utilizing the system 200 described with respect to FIG. 2 according to the method 720 of FIG. 7C, the frame read module 210 may read frame $F_3$ and transmit it to the segmentation operator 220 for segmentation. The segmentation operator 220 may transmit segmented frames $F_{2s}$ and $F_{3s}$ to the deformation field module 230. The deformation field module 230 may generate global motion deformation vector field $V_{3global}$ by inputting $F_{2s}$ and $F_{3s}$ into the GLORIA algorithm to calculate/estimate global motion group parameters for the group motion components of the motion group for application to the motion group vector fields of group G without calculating the original optical flow vector field at each point of the frame. The deformation field module 230 may transmit the global motion deformation vector field $V_{3global}$ to the cumulative vector field module 240 for an iterative generation of the cumulative global motion deformation vector field $W_3$. For example, the cumulative vector field module 240 may input vector fields $V_{3global}$ and $W_2$ into the morph operation ($V_3 (W_2)$) to combine the global movements ($W_2$) with the global movements calculated ($V_{3global}$). The cumulative vector field module 240 may transmit the cumulative global motion deformation vector field $W_3$ to the frame stabilization module 250. Original frame $F_3$ may also be directly or indirectly transmitted to the frame stabilization module 250. The frame stabilization module 250 may use the cumulative global motion deformation vector field $W_3$ and original frame $F_3$ to morph original frame $F_3$ by vector field $W_3$ to generate stabilized frame $F_{3stable}$ having cumulated global movement removed.

The stabilized frames $F_{2stable}$, $F_{3stable}$ may be subjected to further editing, e.g., smoothing and/or filtering. In one example, editing is performed by an editing submodule 252 as described with respect to FIG. 2.

FIGS. 8-11 provide further methods for performing global stabilization processing, and which may also be utilized in image processing according to various embodiments of the process flow 600 described with respect to FIG. 6.

Figure 8:
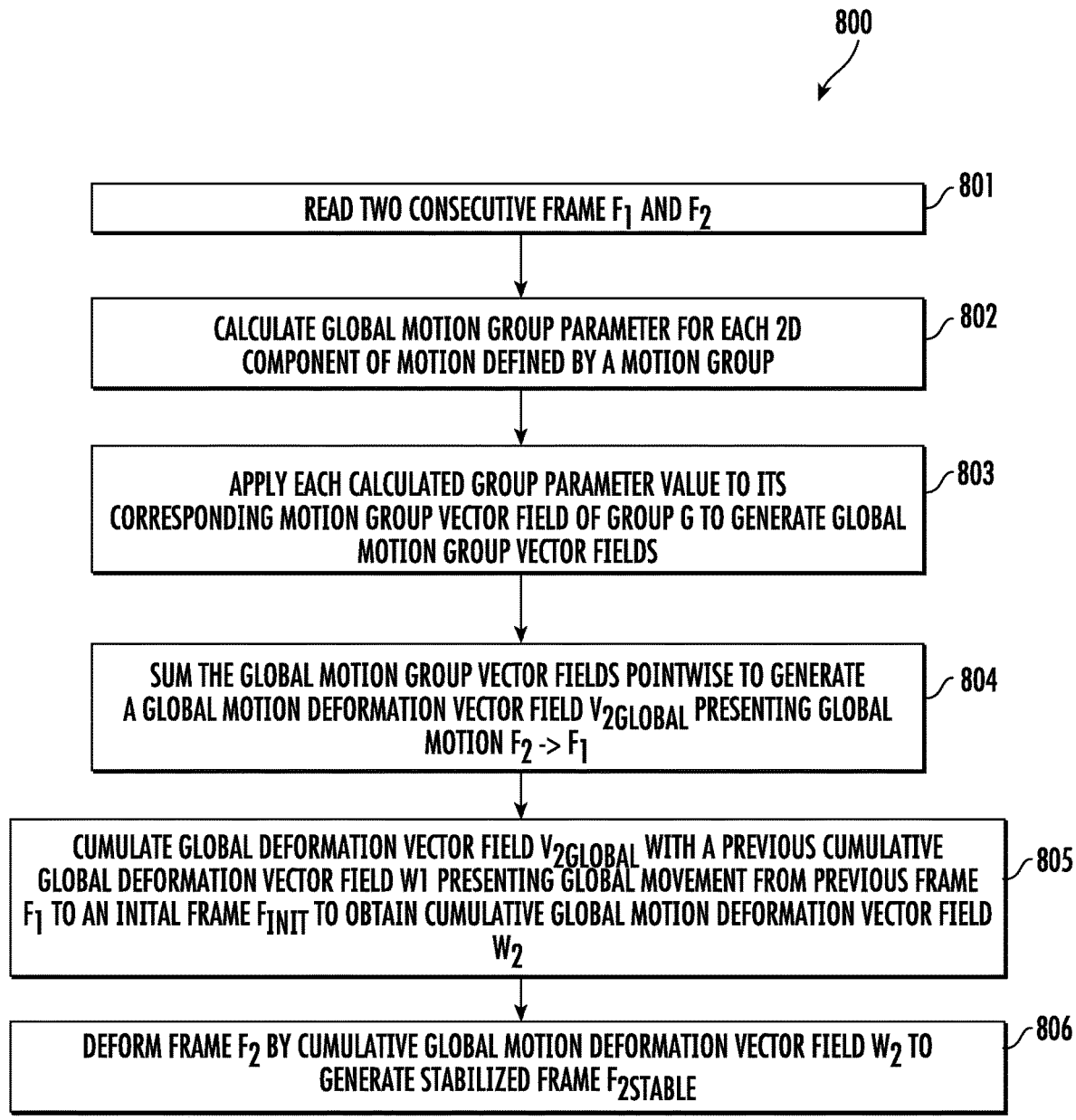
FIG. 8 illustrates a method of GMIS according to various embodiments described herein.

FIG. 8 illustrates an embodiment of a global image stabilization method 800. The method 800 may include reading two consecutive image frames $F_1$ and $F_2$ 801, as described above, which may be performed by a frame read module. The method 800 may further include calculating global motion group parameters for each 2D component of motion defined by a motion group 802. Each calculated global motion group parameter may include a mean motion component value of a layer of global motion between $F_2$ and $F_1$ corresponding to a motion group component of the motion group. Each calculated motion group parameter may be applied to its corresponding motion group vector field of group G to generate a global motion group vector field for each motion group component 803. The global motion group vector fields may be summed to generate a summed global motion deformation vector field $V_{2global}$ presenting global motion $F_2 \rightarrow F_1$ 804. Calculating the global motion group parameters 802, applying the parameter values to group G 802, and summing of the generated global motion group vector fields may be performed by the deformation field module. Global motion deformation vector field $V_{2global}$ may be cumulated with a previous cumulative global motion deformation vector field $W_1$, presenting global movement from previous frame $F_1$ to an initial frame $F_{init}$ to obtain cumulative global motion deformation vector field $W_2$ 805. Cumulating may be performed by the cumulative vector filed module. Frame $F_2$ may be deformed by cumulative global motion deformation vector field $W_2$ to generate stabilized frame $F_{2stable}$. Generating the stabilize frame may be performed by the frame stabilization module. As noted above and elsewhere herein, pre-processing, e.g., with segmentation operator, and/or imaged editing, e.g., with editing submodule, may also be used. The process may be repeated for subsequent frames 806, if any.

Figure 9:
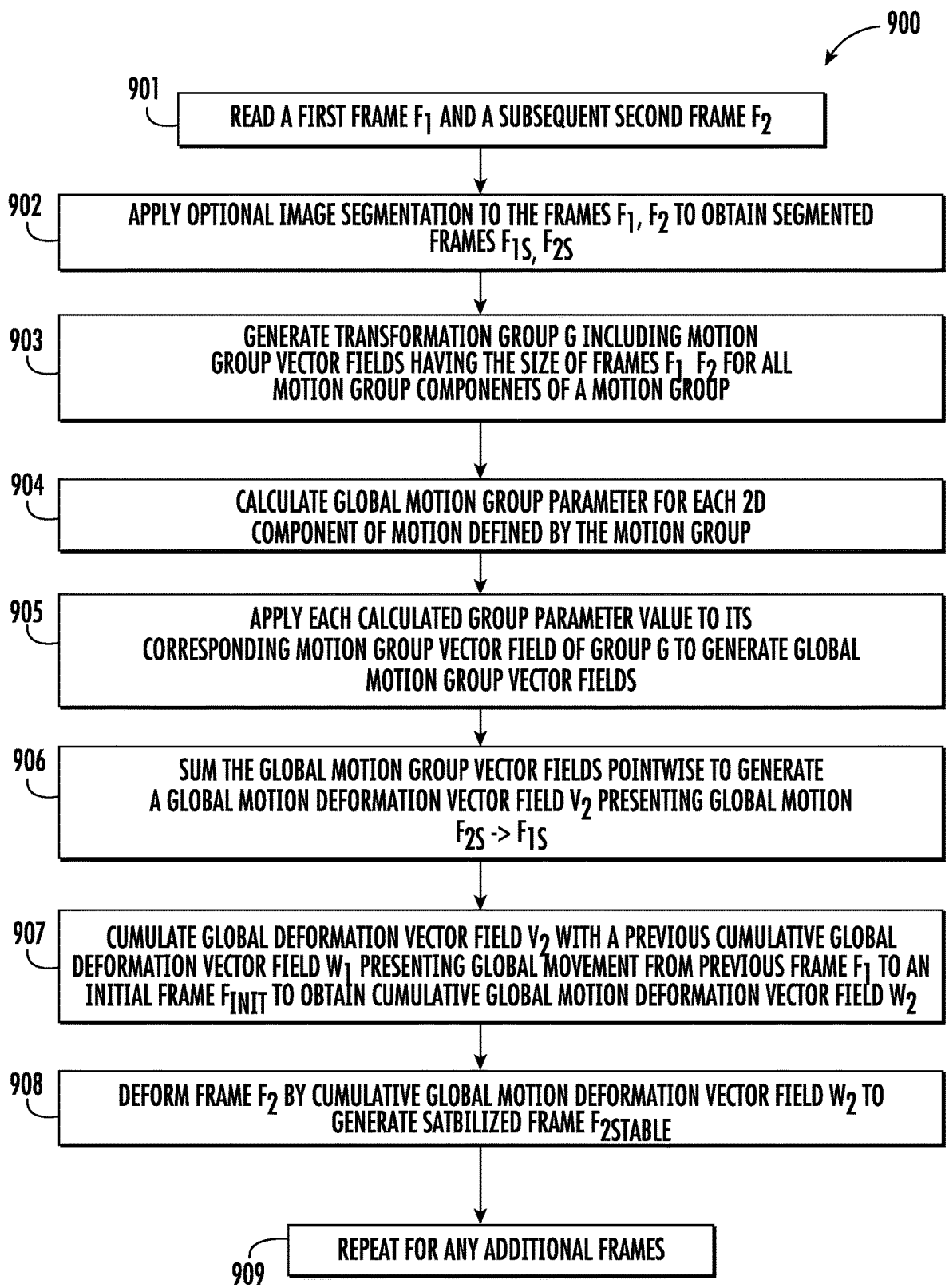
FIG. 9 illustrates a method of GMIS according to various embodiments described herein.

FIG. 9 illustrates an embodiment of a global image stabilization method 900. The method 900 may include reading two consecutive image frames $F_1$ and $F_2$ 901, as described above, which may be performed by a frame read module. Optional image segmentation, e.g., with segmentation operator, may be applied to the frames $F_1$, $F_2$ to obtain segmented frame $F_{1s}$, $F_{2s}$ 902. A group G including motion group vector fields having the size of frames $F_1$, $F_2$ for all motion group components of a motion group, e.g., six motion components described with respect to FIG. 1, may be generated, carried over from a previous step, or obtained from a suitable previously generated motion group G 903. A global motion group parameter for each 2D component of motion defined by the motion group may be calculated 904. Each calculated group parameter value may be applied to its corresponding motion group vector field of group G to generate a group transformation, e.g., global motion group vector fields 905. For example, the motion group parameters may be multiplied by the motion group vector fields of group G to generate global motion group vector fields. The group transformations may be summed to generate a global motion deformation vector field $V_{2global}$ presenting global motion $F_{2s} \rightarrow F_{1s}$ 906. In one embodiment, steps 903-906 may be performed by the deformation field module. Global motion deformation vector field $V_{2global}$ may be cumulated with a previous cumulative global motion deformation vector field $W_1$ presenting global movement from $F_{1s}$ to an initial segmented frame $F_{init}$, if present, to obtain cumulative global motion deformation vector field $W_2$ 907, which may be performed by the cumulative vector field module. Frame $F_2$ may be deformed by cumulative global motion deformation vector field $W_2$ to generate stabilized frame $F_{2stable}$ 908, which may be performed by the frame stabilization module. As noted above and elsewhere herein, pre-processing, e.g., with segmentation operator, and/or imaged editing, e.g., with editing submodule, may also be used. The process may be repeated for any additional frames 909 if desired.

Figure 10:
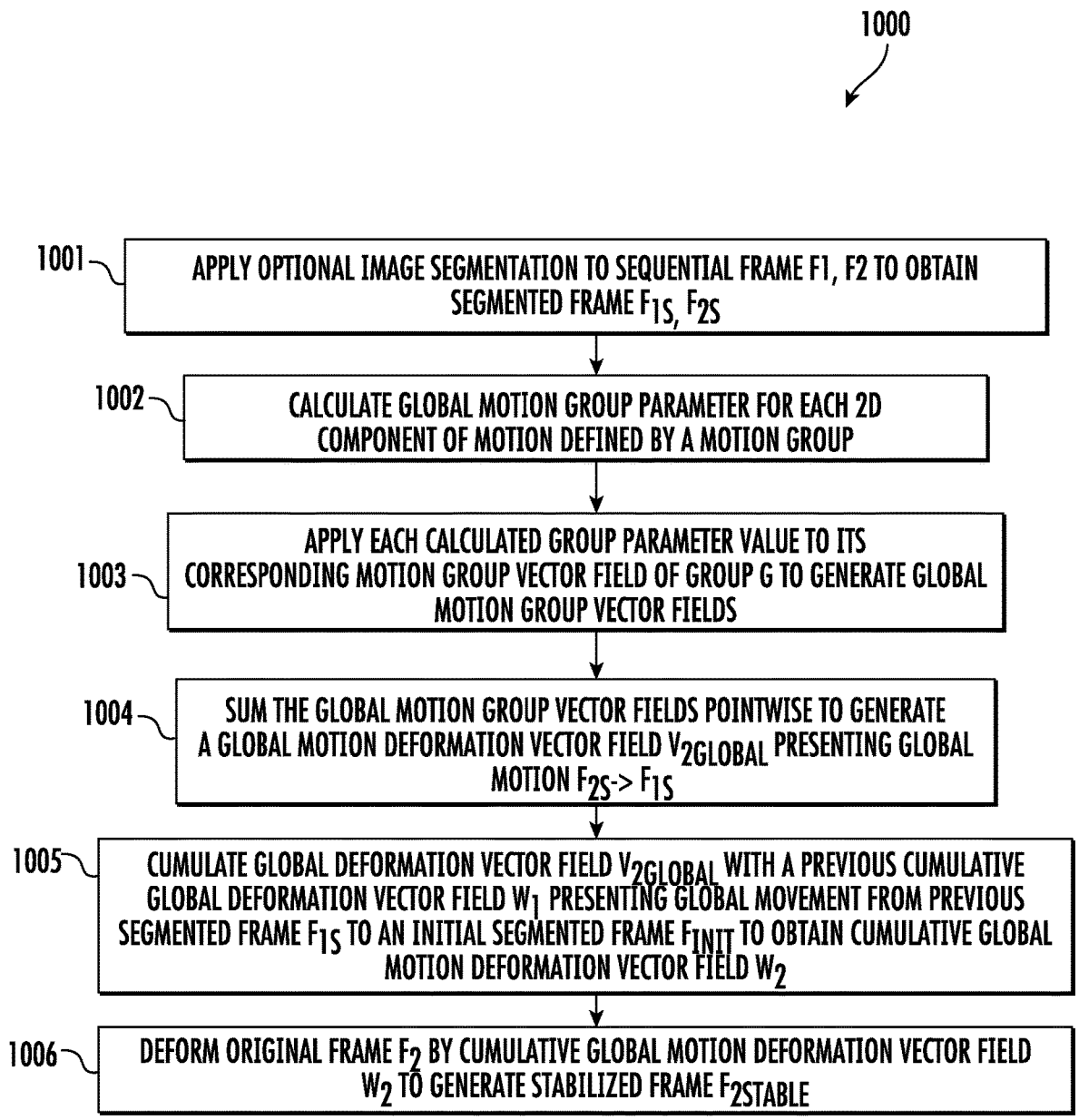
FIG. 10 illustrates a method of GMIS according to various embodiments described herein.

FIG. 10 illustrates an embodiment of a global image stabilization method 1000. The method 1000 may include applying an optional image segmentation, e.g., with segmentation operator, applied to sequential frames $F_1$, $F_2$ to obtain segmented frame $F_{1s}$, $F_{2s}$ 1001. Global motion group parameters may be calculated for each 2D motion component of a motion group for a vector field that drives frame $F_2$ to frame $F_1$ 1002. Each calculated group parameter value may be applied to a corresponding motion group vector field of a group G of 2D transformations to generate global motion group vector fields 1003. The global motion group vector fields represent 2D component layers of global motion from frames $F_2$ to $F_1$. The group G of 2D motion component transformations may be generated, carried over from a previous step, or obtained from a suitable previously generated group G. A global motion deformation vector field $V_{2global}$ may then be generated that sums pointwise the global motion group vector fields to generate a global motion deformation vector field $V_{2global}$ that presents global motion $F_{2s} \rightarrow F_{1s}$ 1004. Global motion deformation vector field $V_{2global}$ may be cumulated with a previous cumulative global motion deformation vector field $W_1$ that presents global movement from frame $F_1$ to an initial frame $F_{init}$ to obtain cumulative global motion deformation vector field $W_2$ 1005. Cumulating the vector fields may be performed by the cumulative vector field module. Frame $F_2$ may be deformed by cumulative global motion deformation vector field $W_2$ to generate a stabilized frame $F_{2stable}$ 1006, which may be performed by the frame stabilization module. Imaged editing, e.g., with editing submodule, may also be used. The process may be repeated for any additional frame 1006.

Figure 11:
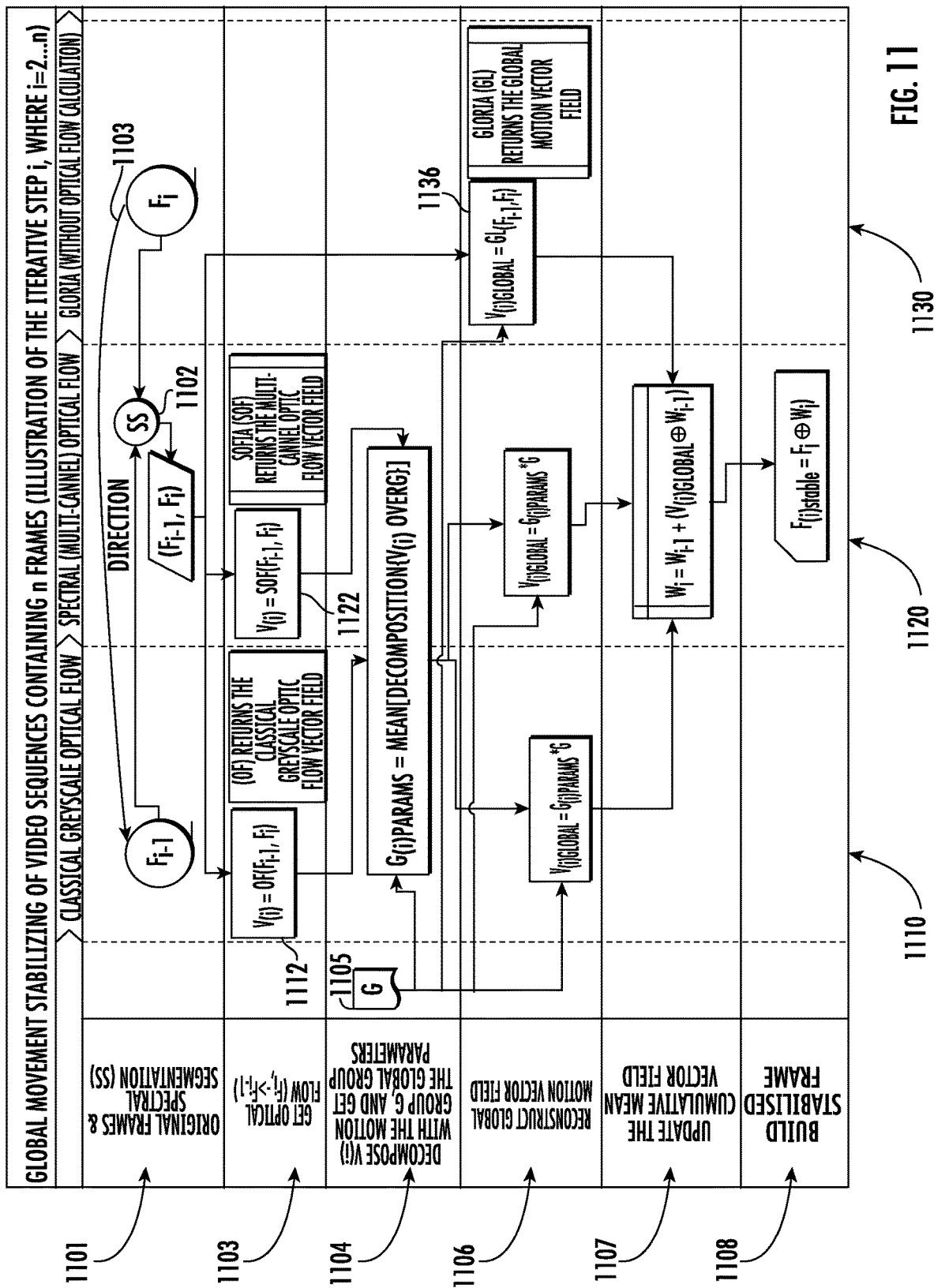
FIG. 11 illustrates three variations of applying GMIS according to various embodiments described herein.

FIG. 11 illustrates three variations of GMIS according to various embodiments of the present disclosure. The first method 1110 utilizes classical grayscale optical flow and the second method 1120 utilizes spectral (multi-channel) optical flow, while the third method 1130 utilizes a methodology without an optical flow calculation. The methods 1110, 1120, 1130 are depicted as being applied to video sequences containing n frames and illustrates the iterative step i, where i=2 . . . n.

Original frames $F_{i-1}$ and $F_i$ may be handled or otherwise read 1101, e.g., by a frame read module, as described above and elsewhere herein. Optional image segmentation 1102, e.g., by a segmentation operator, may be applied to the frames as also described above and elsewhere herein. For example, image segmentation may include segmenting images by regions, shapes, edges, or spectral values. The illustration also depicts optical flow direction 1103, which is chronologically reversed.

The optical flow vector field $V_i$ that drives ($F_i \rightarrow F_{i-1}$) may be calculated 1103 in methods 1110 and 1120. With respect to calculation of optical flow vector field $V_i$ classical grayscale optical flow of method 1110, shown as $V_i = OF(F_i \rightarrow F_{i-1})$ 1112, the classic equations return a classical grayscale optical flow vector field $V_i$. Utilizing spectral optical flow according to method 1120, e.g., applying SOFIA (Kalitzin et al. 2018a) to frames $F_i$, $F_{i-1}$, shown as $V_i = SOF(F_i \rightarrow F_{i-1})$ 1122, a multi-channel optical flow vector field $V_i$ may be obtained that drives $F_i \rightarrow F_{i-1}$.

In methods 1110 and 1120, the optical flow vector field $V_i$ may be decomposed with motion group G and global motion group parameters $G_{(i)params}$ may be obtained 1104, as described above and elsewhere herein, wherein $G_{(i)params}$ = mean[Decomposition {$V_i$ over G}]. For example, optical flow vector field Vi may be decomposed over the motion group components of the motion group corresponding to group G to calculate motion group decomposition vector fields from which global motion group parameters may be calculated as a mean of each motion group component represented in the decomposition vector fields. Global motion group parameters $G_{(i)params}$. Thus, the global motion group parameters $G_{(i)params}$ may comprise a value for each motion group component representing a mean global motion from $F_i \rightarrow F_{i-1}$ for the particular motion group component.

In one example, the calculations may decompose $V_i$ by the motion group components to determine a motion group decomposition vector field for each motion group component, which may be elementary 2D linear transformations as described herein. For instance, optical flow vector field $V_i$, which includes local and global motion, may be decomposed by the motion group to determine a motion group decomposition vector field for each motion group component. If the motion group includes six motion group components such as X translation, Y translation, dilatation, rotation, shear out, and shear in, vector field $V_i$ may be decomposed into six motion group decomposition fields, one for each motion group component. Thus, the global motion group parameters $G_{(i)params}$ may comprise calculated mean or average motion in each decomposition layer as calculated from each motion group decomposition vector field.

In methods 1110, 1120, and 1130, a global motion deformation vector field $V_{(i)global}$ may be generated 1106.

In methods 1110 and 1120, the global motion deformation vector field $V_{(i)global}$ may be generated as depicted in the notation $V_{(i)global}=(G_{(i)params}*G)$. For example, the global motion group parameters $G_{(i)params}$ may be applied over the motion group vector fields of group G to generate global motion group vector fields, one for each motion component represented in the motion group, which may be summed pointwise to generate the global motion deformation vector field V(i)global.

In method 1130, GLORIA may be utilized to generate the global motion deformation vector field $V_{(i)global}$ 1106, depicted in notation $V_{(i)global}=GL(F_i, F_{i-1})$. As described herein, global motion deformation vector field $V_{(i)global}$ may be calculated 1136 from frames $F_i$, $F_{i-1}$ utilizing the GLORIA algorithm, which avoids a need to undertake the computationally expensive generation of the optical flow vector field $V_i$ at each point of the frame. For example, the GLORIA algorithm may calculate global motion group parameters $G_{(i)params}$ as a mean global motion value for each global motion component of group G and generate the global motion deformation vector field $V_{(i)global}$ from the parameter values corresponding to the parameter values as applied to motion group vector fields of group G, e.g., global motion group vector fields. As noted above, global motion deformation vector field $V_{(i)global}$ may correspond to global motion group vector fields summed pointwise.

When segmentation is used, calculating the optical flow vector field $V_i$ that drives $F_i$ to $F_{i-1}$ 1103 using classical optical flow 1112 according to method 1110 or spectral optical flow 1122 according to method 1120 utilizes segmented versions of the frames. Similarly, when segmentation is used in method 1130, the segmented versions of the frames are used to calculate the global motion deformation vector field 1136 using GLORIA.

In some embodiments, obtaining the optical flow vector field $V_i$ 1103, decomposition of $V_i$ and generation of the global motion group parameters $G_{(i)params}$ 1104, and/or generation of the global motion deformation vector field $V_{(i)global}$ 1106 may be executed by the deformation field module as described herein.

In a further embodiment, methods 1110, 1120, or 1130 may also include generating the group G of motion group vector fields representing inhomogeneous 2D linear transformations, one for each motion group of the motion group, which will typically be predetermined or otherwise input into the system. In one example, group G is generated including the six motion components described in FIG. 1.

The methods 1110, 1120, 1130 may also include cumulating global motion deformation vector field V(i)global with a previously calculated cumulative mean global motion deformation vector field $W_{i-1}$ to obtain cumulative mean global motion deformation vector field $W_i$ that updates the cumulative mean global motion deformation vector field 1107 in a manner similar to that described above and elsewhere herein and which is notated $W_i=W_i-1+ (V_{(i)global}\oplus W_{i-1})$. The previously calculated cumulative mean global motion deformation vector field $W_{i-1}$ presents global movement from frame $F_i$ to an initial frame $F_{init}$. If frame $F_{-i}$ is the initial frame $F_{init}$, the previous cumulative mean global motion deformation vector field $W_{i-1}$ will be zero as no previous global movement has been calculated and frame $F_{i-1}$ is the reference frame. The morph$\oplus$operation may be applied to the current global motion deformation vector field $V_{(i)global}$ and the previous cumulative global motion deformation vector field $W_{i-1}$ to cumulate all the calculated global movements vector fields so far, thereby updating the cumulative mean global motion deformation vector field $W_i$. In some embodiments, updating the cumulative mean global motion deformation vector field 1107 may be performed by the cumulative vector field module.

The methods 1110, 1120, 1130 may also include building stabilized frames 1108. For example, original frame $F_i$ may be deforming by the cumulative mean global motion deformation vector field $W_i$ to generate stabilized frame $F_{(i)stable}$, notated as $F_{(i)stable}=(F_i\oplus W_i)$ in FIG. 11. Thus, frame $F_i$, which includes both local and global movements, may be deformed by a cumulative mean global motion deformation vector field presenting cumulative global movement with local movement removed. The deformation removes the global movement to stabilize frame $F_i$ to new frame $F_{(i)stable}$, that replaces frame $F_i$ in the image frame sequence. As frame $F_i$ includes both local movement and global movement, which may also include accumulated global movement, morphing$\oplus$frame $F_i$ with the cumulative mean global motion deformation vector field $W_i$ retains local movement while removing global movement as well as accumulated global movement. In some embodiments, building stabilized frames may be performed by a frame stabilization module. In one embodiment, additional image processing such as smoothing may be applied to stabilized frames.

Upon reading the present description, those having skill in the art will be equipped to apply the make and use the present system and methods. For example, the various optical flow concepts described herein may be applied using various calculuses known to or derivable by those having skill in the art. Example equations are provided below to further aid the reader in various methodologies that may be applied to perform various operations described herein.

Optical Flow Problem, Vector-Field Reconstruction and Spectral Cost-Function Approximation Optical flow attempts to determine a deformation field given the image evolution. Deformation of an image may be described by the change of position x of its points in time t. Therefore, new image values at a given point are those transported from an old or previous image due to the spatial deformation Eq. (1).

$$L^c(x,t+\delta t)=L^c(x-v(x,t)\delta t,t)-D_v\{L^c\} \tag{1}$$

v(x, t) is a deformation vector field with a tiny parameter change δt.

$L^c(x, t)$; c=1, . . . , $N_c$, $x \in R^2$ is a multi-channel image.

c=1, . . . , $N_c$ are channels, i.e. a set of spectral components—for example, RGB.

$D_v\{L^c\}$ is a vector-field induced diffeomorphism applied to the image function.

Assuming small changes and continuously differentiable functions and using notations from differential geometry where the vector field is a differential operator $\nabla_v$, the Eq. (1) might be rewritten as a differential equation Eq. (2).

$$\frac{dL^c}{dt} = -\nabla L^c \cdot v \equiv \nabla_v L^c; \tag{2}$$

$$\nabla_v \equiv v \cdot \nabla \equiv \sum_k v_k \nabla_k; \nabla_k L^c \equiv \frac{\partial L^c}{\partial x_k}$$

From Eq. (2) it follows that in the monochromatic case $N_c=1$ the deformation field is defined only along the image gradient, and the reconstruction problem is underdetermined. On the contrary, if $N_c \geq 2$ the problem may be over-determined as the number of equations will exceed the number of unknown variables. However, if the spectrum is degenerate, for example, when all spectral components are linearly dependent, the problem is still under-determined.

To account for both under and over-determined situations the following minimization problem defined by the quadratic local cost-function in each point (x, t) of the image sequence may be postulated:

$$C\{L^c(x, t), v(x, t)\} \equiv \sum_c \left| \frac{dL^c(x, t)}{dt} + \nabla L^c(x, t) \cdot v(x, t) \right|^2 \quad (3)$$

$$v(x, t) = \text{argmin}_v [C\{v(x, t)\}]$$

The solution for v(x, t) always exists because the cost-function in Eq. (3) is positive. However, this solution may not be unique because of possible zero modes, i.e. local directions of the deformation field along which the cost-functional is invariant.

A general approach to solve Eq. (3) is presented in Kalitzin et. al, 2018a.

Fast reconstruction of the global deformation vector field v(x, t) may be executed following Kalitzin et al. 2018b.

Group Parameter Reconstruction

For several applications, including the present one, it might be advantageous to look only for solutions for the optical flow equation that represent known group transformations. Wherein v(x, t) may be represented in a form given in Eq. (4)

$$v(x, t) \equiv \sum_a A^u(t) v^u(x), u = 1 \cdots N_G \quad (4)$$

G is a known group of transformations;
$N_G$ is the number of group generators;
$v^u(x)$ are the vector fields corresponding to each group generator;
$A^u(t)$ are the corresponding transformation parameters.

Then, the minimization problem may be reformulated the by substituting Eq. (4) into the cost-function Eq. (3) and consider it as a minimization problem for determining the group-coefficients $A^u$ (t).

$$C\{A\} \equiv \sum_{c,x} \left| \frac{dL^c(x, t)}{dt} + \sum_u A^u(t) v^u(x) \cdot \nabla L^c(x, t) \right|^2 \quad (5)$$

$$A(t) = \text{argmin}_A [C\{A(t)\}]$$

The generators of infinitesimal transformations algebra may be introduced as a set of differential operators using notations from differential geometry. The defined in Eq. (6) operators form the Lie algebra of the transformation group.

$$G^u(x) \equiv \sum_k v_k^u(k) \nabla_k \quad (6)$$

Structural Tensor, Spatial Smoothening and Regularization

Applying the stationarity condition for Eq. (5) and introducing the quantities:

$$H^u = -\sum_{x,k,c} v_k^u(x) \frac{dL^c}{dt} \nabla_k L^u; \quad (7)$$

$$S^{uq} = \sum_{x,k,j,c} v_k^u(x) \nabla_k L^c \nabla_j L^c v_j^q(x); u, q = 1 \cdots N_A$$

The equation for the coefficients minimizing the function may be written in a form:

$$\sum_q S^{uq} A^q = H^u \quad (8)$$

The equation for the coefficients minimizing the function may be written in a form: In Eq. (8) $S^{uq}$ may refer as the structural tensor and $H^u$ as the driving vector field. In cases of under-determined system, the removal of local singularities (zero or infinitesimal eigenvalues of the structural tensor) is done by a modified Tikhonov regularization:

$$S_\rho^{uv}(t) \equiv \frac{e_{max}(t)}{e_{max}(t) + \mu(t)} (S^{uv}(t) + \mu(t)I); \quad (9)$$

$$\mu(t) \equiv (\rho e_{max}(t) - e_{min}(t)) \theta(\rho e_{max}(t) - e_{min}(t))$$

$e_{max}/e_{min}$ are the maximal/the minimal eigenvalues of the structural tensor;
I is the unit matrix;
θ is the Heaviside step function;
ρ is a regularization constant The above regularization changes the structural tensor only in points on the deformation trajectory t where $e_{min}(t) < \rho e_{max}(t)$ by setting the minimum eigenvalue to ρ and leaving the maximum unchanged. Therefore, the procedure leads to a non-singular structural tensor in all points. The Eq. (9) may be inverted to obtain the unique solution for the optical flow vector field, for a given scale and regularization parameter:

$$A^u = (S_\rho^{uv})^{-1} H^u \quad (10)$$

Two-Dimensional Linear Transformations Group

The above reconstruction method may be applied in sequences of two-dimensional images. If restricting the transformations to the six parameters non-homogeneous linear group or motion group, the vector generators may be presented in Eq. (11):

$$G^{translations1}(x) = \nabla_1; G^{translations2}(x) = \nabla_2;$$

$$G^{rotation}(x) = x_2 \nabla_1 - x_1 \nabla_2; G^{dilatation}(x) = x_1 \nabla_1 + x_2 \nabla_2;$$

$$G^{shear1}(x) = x_1 \nabla_2; G^{shear2}(x) = x_2 \nabla_1 \quad (11)$$

Motion Tracking and Integration of the Group Transformations

The application of two successive morphisms $v^{(k)}$ and $g^{(k)}$ is not equivalent to one with the sum of the two vector fields. More precisely, one needs to "morph" the first vector field (shift its spatial arguments) by the second one.

The resulting vector diffeomorphism may be given as $$V(v, g) = v + D_g\{v\} \equiv v + g + g \cdot \nabla v \quad (13)$$

The Eq. (13) may be applied iteratively to reconstruct the global transformation between the initial image and any subsequent image of the sequence.

Further calculations may be utilized, such as those described in Kalitzin et al. 2018a; and Kalitzin et al. 2018b, both of which are incorporated herein by reference.

Removal of global movements while maintaining local movement as described herein may be utilized in many applications such as analysis of local movement associated with a moving object. For example, video images of an infant positioned on a moving platform may be processed as described herein to remove movements that are associated with the infant being moved by the platform relative to the frame while maintaining local movements that are not associated with the movement of the platform, e.g., to detect kicking, wiggling, or respiration. Thus, local movements such as respiration and those associated with seizures may be identified, tracked, and/or measured while an individual or device capturing the image is moving. In one embodiment, the present GMIS system, process, or both may be applied to a bassinet having a moving platform as described in U.S. Pat. No. 10,532,182. In one example, a video imaging device may be directed at an infant positioned on a moving platform. For example, the video imaging device may be attached to or integrated with a bassinet or crib or be provided in or attached to another structure, such as a mobile. The captured images may be processed locally or remotely as described herein to remove global movement while retaining local movements. Stabilized frames may be analyzed with machine learning or artificial intelligence techniques. The stabilized frames, including local movements, may be analyzed by a controller having a processor to track respiration of the infant. The tracked respiration data may be utilized for analysis of the infant's health. For example, respiration analysis may be used to predict or identify health issues such as dyspnea, tachypnea, hyperpnea, colds or other infections, asthma, allergies, dehydration, diabetes, fever, cardiovascular health, lung conditions, respiratory obstructions. Analysis of the stabilized frames may be combined with additional infant data, such as heart rate and/or temperature, to improve medical condition identification and/or prediction. As noted above, the present global stabilization processes may be applied to not only grayscale images but also color images. In some applications, stabilized frames may be analyzed to track color changes such as skin color changes of an infant's body, e.g., face, nose, lips, head, ears, neck, arms, hands, legs, feet, or combination thereof, to provide information regarding the infant's health.

It is to be appreciated that the present methods may be modified for the removal of other or different movements from images. For example, movements may be defined for removal or retention in images based on threshold parameters, such as magnitude, direction, regional coherence or incoherence in magnitude and/or direction. The present methods may be applied to local movement for local stabilization of images to remove all or portions of local movement from images, for instance.

The present global stabilization systems and/or processes is not limited to the use of tracking local movements of an infant and may be applied to adults as well as other living organisms. The global stabilization processes may also be used to remove global movement associated with non-living objects. For example, sequential video images of moving parts of a machine may be captured to remove global movement to analyze local movement of components subject to global movement. The global stabilization processes may also find use in stabilization of images captured from a moving camera as well as or in addition to a moving scene.

The systems and methods described herein may be executed by hardware or be embodied in software stored in memory and executable by hardware. For example, the methods and systems described herein may include a memory that stores instructions, and processor that executes the instructions to perform the operations described herein. The present disclosure may include dedicated hardware implementations including, but not limited to, application-specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example network or system is applicable to software, firmware, and hardware implementations. As used herein "transmit" means that data or representation of the data is transmitted by wire, wirelessly, or is otherwise made available to the receiving component, e.g., process, algorithm, module, operator, engine, generator, controller, or the like. In some examples, data transmitted to a receiving component may be transmitted to another component or database wherein the data may be further transmitted to the receiving component or otherwise made available to the receiving component. Thus, data transmitted by a first component/processing module to a second component/processing module may be directly or indirectly transmitted. In one example, data may be transmitted by the transmitting component or another component to a receiving component by transmitting an address, location, or pointer to the data stored in memory, such as one or more databases.

In accordance with various embodiments of the present disclosure, the processes described herein may be intended for operation as software programs running on a computer processor. Furthermore, software implementations can include but are not limited to, distributed processing or component/object distributed processing, parallel processing, or virtual machine processing that may be constructed to implement the methods described herein.

The present disclosure describes various systems, modules, units, devices, components, and the like. Such systems, modules, units, devices, components, and/or functionalities thereof may include one or more electronic processors, e.g., microprocessors, operable to execute instructions corresponding to the functionalities described herein. Such instructions may be stored on a computer-readable medium. Such systems, modules, units, devices, components, the like may include functionally related hardware, instructions, firmware, or software. For example, modules or units thereof, which may include generators or engines, may include a physical or logical grouping of functionally related applications, services, resources, assets, systems, programs, databases, or the like. The systems, modules, units, which may include data storage devices such as databases and/or pattern library may include hardware storing instructions configured to execute disclosed functionalities, which may be physically located in one or more physical locations. For example, systems, modules, units, or components or functionalities thereof may be distributed across one or more networks, systems, devices, or combination thereof. It will be appreciated that the various functionalities of these features may be modular, distributed, and/or integrated over one or more physical devices. It will be appreciated that such logical partitions may not correspond to the physical partitions of the data. For example, all or portions of various systems, modules, units, or devices may reside or be distributed among one or more hardware locations.

The present disclosure contemplates a machine-readable medium containing instructions so that a device connected to the communications network, another network, or a combination thereof, can send or receive voice, video or data, and to communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or re-organizing any of the disclosed steps, components, elements, features, aspects, characteristics, limitations, and the like, of the various non-limiting and non-exhaustive embodiments described in this specification.

Various elements described herein have been described as alternatives or alternative combinations, e.g., in lists of selectable actives, ingredients, or compositions. It is to be appreciated that embodiments may include one, more, or all of any such elements. Thus, this description includes embodiments of all such elements independently and embodiments, including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" corresponds to "x and/or y" and refers to "x", "y", or both "x" and "y", whereas "either x or y" refers to exclusivity.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments could be modified, reduced, or enhanced without departing from the scope and spirit of the claims described below.

What is claimed is:

1. A global movement image stabilization method, the method comprising:
    reading a first frame and a second frame of an image sequence, wherein the first frame is chronologically earlier than the second frame in the image sequence;
    calculating, with respect to motion from the second frame to the first frame, a global motion group parameter for each elementary 2D motion component of a motion group, wherein the motion group defines a group of elementary 2D motion components that decompose complex motion within a 2D plane;
    applying each global motion group parameter to a motion group vector field that corresponds to the elementary 2D motion component to which the respective global motion group parameter applies to generate a global motion group vector field corresponding to each elementary 2D motion component of the motion group;
    summing the global motion group vector fields pointwise to generate a global motion deformation vector field that provides global motion from the second frame to the first frame;
    cumulating the global deformation vector field with a previous cumulative global deformation vector field that provides global movement from the first frame to one or more previous frames to generate a current cumulative global motion deformation vector field; and
    deforming the second frame by the current cumulative global motion deformation vector field to generate a stabilized frame.

2. The method of claim 1, wherein calculating the global motion group parameters comprises calculating a mean magnitude of motion for each elementary 2D motion component of the motion group.

3. The method of claim 1, further comprising segmenting the first and second frames, wherein the global motion group parameters are calculated from the segmented first and second frames.

4. The method of claim 3, wherein segmenting the first and second frames comprises applying spectral segmentation to the first and second frames using RGB values.

5. The method of claim 1, wherein the elementary 2D motion components of the motion group comprise X translation, Y translation, dilatation, rotation, shear out, and shear in.

6. The method of claim 1, wherein the motion group vector fields are members of a group G and are set to a frame size corresponding to the first and second frames.

7. The method of claim 6, further comprising generating the motion group vector fields of group G.

8. The method of claim 1, wherein the first and second frames are multichannel images.

9. The method of claim 1, further comprising:
calculating an optical flow vector field that drives the second frame to the first frame;
decomposing the optical flow vector field by the motion group to determine a motion group decomposition vector field for each elementary 2D motion component of the motion group; and
calculating the global motion group parameters from the motion group decomposition vector fields.

10. A global movement image stabilization system, the system comprising:
a memory that stores instructions; and
processor that executes the instructions to perform operations comprising:
reading a first frame and a second frame of an image sequence, wherein the first frame is chronologically earlier than the second frame in the image sequence;
calculating, with respect to motion from the second frame to the first frame, a global motion group parameter for each elementary 2D motion component of a motion group, wherein the motion group defines a group of elementary 2D motion components that decompose complex motion within a 2D plane;
applying each global motion group parameter to a motion group vector field that corresponds to the elementary 2D motion component to which the respective global motion group parameter applies to generate a global motion group vector field corresponding to each elementary 2D motion component of the motion group;
summing the global motion group vector fields pointwise to generate a global motion deformation vector field that provides global motion from the second frame to the first frame;
cumulating the global deformation vector field with a previous cumulative global deformation vector field that provides global movement from the first frame to one or more previous frames to generate a current cumulative global motion deformation vector field; and
deforming the second frame by the current cumulative global motion deformation vector field to generate a stabilized frame.

11. The system of claim 10, wherein the global motion group parameters comprise values for mean magnitude of motion for each elementary 2D motion component of the motion group.

12. The system of claim 10, wherein the operations further comprise segmenting the first and second frames, and wherein the global motion group parameters are calculated from the segmented first and second frames.

13. The system of claim 12, wherein the first and second frames are segmented by spectral segmentation using RGB values.

14. The system of claim 10, wherein the elementary 2D motion components of the motion group comprise X translation, Y translation, dilatation, rotation, shear out, and shear in.

15. The system of claim 10, wherein the motion group vector fields are members of a group G and are set to a frame size corresponding to the first and second frames.

16. The system of claim 15, wherein the operations further comprise generating the motion group vector fields of group G.

17. The system of claim 10, wherein the first and second frames are multichannel images.

18. The system of claim 10, wherein the operations further comprise:
calculating an optical flow vector field that drives the second frame to the first frame;
decomposing the optical flow vector field by the motion group to determine a motion group decomposition vector field for each elementary 2D motion component of the motion group; and
calculating the global motion group parameters from the motion group decomposition vector fields.

19. A global movement image stabilization system, the system comprising:
a memory that stores instructions; and
processor that executes the instructions to perform operations comprising:
calculating an optical flow vector field that drives a second frame of an image sequence to a first frame of an image sequence, wherein the first frame is chronologically earlier than the second frame in the image sequence;
decomposing the optical flow vector field by a motion group to determine a motion group decomposition vector field for each elementary 2D motion component of the motion group, wherein the elementary 2D motion components decompose complex motion within a 2D plane;
calculating global motion group parameters from the motion group decomposition vector fields;
applying each global motion group parameter to a motion group vector field that corresponds to the elementary 2D motion component to which the respective global motion group parameter applies to generate a global motion group vector field corresponding to each elementary 2D motion component of the motion group;
summing the global motion group vector fields pointwise to generate a global motion deformation vector field that provides global motion from the second frame to the first frame;
cumulating the global deformation vector field with a previous cumulative global deformation vector field that provides global movement from the first frame to one or more previous frames to generate a current cumulative global motion deformation vector field; and
deforming the second frame by the current cumulative global motion deformation vector field to generate a stabilized frame.

20. The system of claim 19, wherein the global motion group parameters comprise values for mean magnitude of motion for each elementary 2D motion component of the motion group.

21. The system of claim 19, wherein the operations further comprise segmenting the first and second frames, and wherein the global motion group parameters are calculated from the segmented first and second frames.

22. The system of claim 21, wherein the first and second frames are segmented by spectral segmentation using RGB values.

23. The system of claim 22, wherein the elementary 2D motion components of the motion group comprise X translation, Y translation, dilatation, rotation, shear out, and shear in.

24. The system of claim 19, wherein the motion group vector fields are members of a group G and are set to a frame size corresponding to the first and second frames.

25. The system of claim 24, wherein the operations further comprise generating the motion group vector fields of group G.

* * * * *